US005556354A

United States Patent [19]
Meier-Burkamp

[11] Patent Number: 5,556,354
[45] Date of Patent: Sep. 17, 1996

[54] SHIFTING ARRANGEMENT FOR A CHANGE GEAR DRIVE IN MULTISPEED HUBS FOR BICYCLES

[75] Inventor: Gerhard Meier-Burkamp, Bergrheinfeld, Germany

[73] Assignee: Fichtel & Sachs AG, Schweinfurt, Germany

[21] Appl. No.: 430,502

[22] Filed: Apr. 28, 1995

[30] Foreign Application Priority Data

Apr. 30, 1994 [DE] Germany ................. 44 15 266.3

[51] Int. Cl.⁶ .................................................. F16H 3/62
[52] U.S. Cl. ...................... 475/275; 475/280; 475/281
[58] Field of Search ............................ 475/275, 284, 475/285, 298, 300, 339, 340, 338, 280, 281

[56] References Cited

U.S. PATENT DOCUMENTS

| | | | |
|---|---|---|---|
| 3,886,811 | 6/1975 | Hillyer | 475/299 X |
| 4,973,297 | 11/1990 | Bergles | 475/300 X |
| 5,078,664 | 1/1992 | Nagano | 475/314 X |
| 5,273,500 | 12/1993 | Nagano | 475/312 |
| 5,322,487 | 6/1994 | Nagano | 475/297 |
| 5,399,128 | 3/1995 | Nürnberger | 475/298 |

FOREIGN PATENT DOCUMENTS

| | | |
|---|---|---|
| 0391668 | 11/1990 | Austria . |
| 0859274 | 5/1939 | France . |
| 1081334 | 5/1955 | Germany . |
| 2458871 | 6/1975 | Germany . |
| 4142867 | 7/1992 | Germany . |

*Primary Examiner*—Charles A. Marmor
*Assistant Examiner*—Peter Kwon
*Attorney, Agent, or Firm*—Nils H. Ljungman and Associates

[57] ABSTRACT

A shifting arrangement for change gear drives in multispeed hubs for bicycles has a plurality of control planes coaxially disposed relative to one another, within which, by cam control, trip cam rods, which are installed on the surface of the hub axle coaxially thereto, are swivellable around its axis, and which have a first and a second profile, whereby the possibility emerges of engaging and disengaging arbitrarily many couplings disposed one after the other on the hub axle. The shifting arrangement further offers by its design the advantage of controlling pawl couplings, which are disposed on a larger diameter in the change gear drive of the hub, simultaneously and in coordination with the cam control of the sun gears.

20 Claims, 10 Drawing Sheets

A-A

FIG. 6
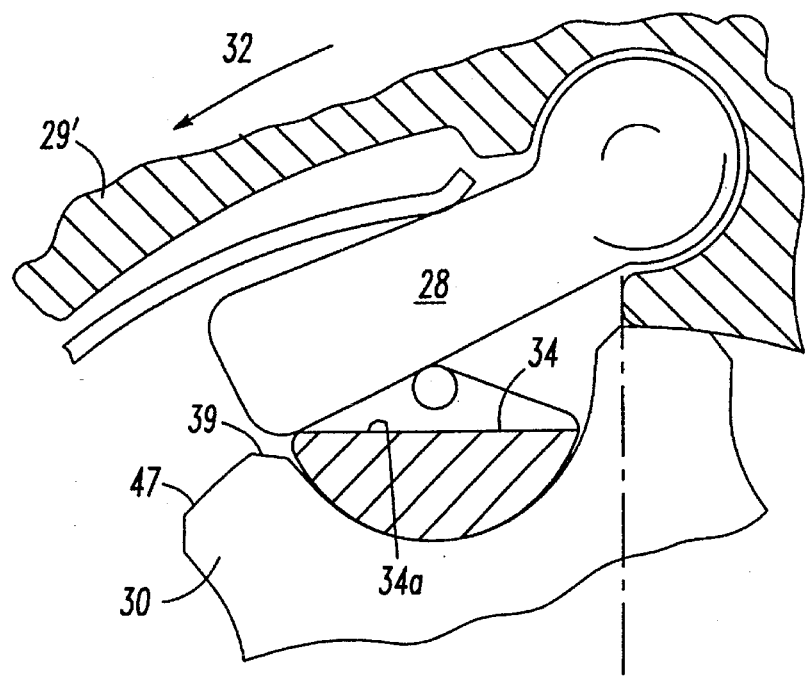
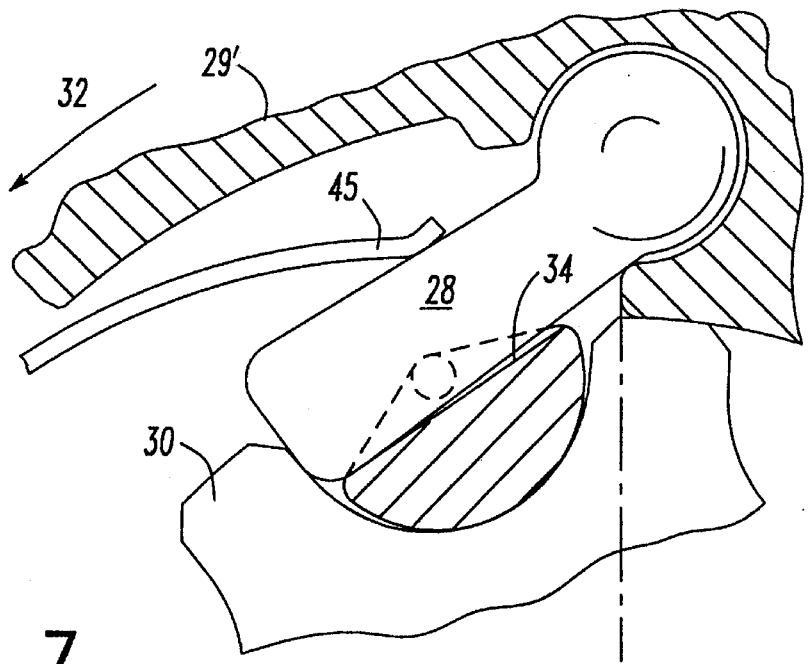
FIG. 7

SHIFTING ARRANGEMENT FOR A CHANGE GEAR DRIVE IN MULTISPEED HUBS FOR BICYCLES

BACKGROUND OF THE INVENTION

1. Field of the Invention

The present invention generally relates to a shifting arrangement for a change gear drive in multispeed hubs for bicycles. A hub in general can have a hub axle, a fixed cone threaded onto the axle and retained by means of a nut, and a cable pulley disposed axially adjacent to the fixed cone on the hub axle. A cable can be installed about at least a portion of the pulley, and, by applying a pulling, or tractive, force on the cable, the pulley can be caused to turn. In addition, there can be a retracting spring to develop a counter-rotational force against the tractive force of the cable wound on the cable pulley. The cable, cable pulley and cone essentially form a part of a shifting arrangement for shifting gearing ratios of the hub. For providing the gearing ratios, there can be at least one sun gear which can be rotationally engaged with, or disengaged from the hub axle by means of at least one pawl. The at least one pawl thereby functions as a clutch, operating in a direction of rotation of the sun gear. There could also possibly be at least one additional pawl on another drive element in the change gear drive to provide additional gearing options. For control of the pawls, there can then be various types of control elements between the shifting arrangement and the pawls.

2. Background Information

German Patent No. 41 42 867 discloses a shifting arrangement concentrically disposed around a hub axle of a gear hub with a plurality of gear levels. In this hub, the planetary drives have planetary gears which engage with sun gears, and the sun gears are freely shiftable between a state in which they are freely rotatable relative to the stationary shaft, and a state fixedly locked to the stationary shaft. The sun gears are shiftable by means of externally activatable couplings, which couplings are active in one direction. The activation of the couplings on the sun gears occurs through position-based relationships of projections formed on the stationary shaft relative to activation elements. The activation elements are disposed on a control element shiftable on circumferential surfaces of the stationary shaft. With such activations of the sun gears, an output drive path can be defined which runs through one of the two unilaterally active couplings.

The above-described activation requires precise matching of the tubular control element as well as its division into two parts, and is generally difficult to assemble. Moreover, the different nature of the control and coupling elements for each shift level is expensive and not very clear.

A shifting arrangement of a similar style is disclosed by German Patent No. 24 58 871, where, by control movements of a likewise tubular control element, couplings operating in one direction can be engaged and disengaged relative to the stationary shaft. Here again, complex assembly of the multipart control element, as well as expensive fabrication of the gear hub consisting of many different parts, are the major obstacles to general production thereof.

OBJECT OF THE INVENTION

In view of the above discussion of available bicycle hubs, and based on current market conditions comes the object of the invention, wherein it is desirable to provide a gear hub which can be cost-effectively produced with a plurality of speeds, and which provides a shifting arrangement which engages and disengages couplings active exclusively in one rotational direction, which couplings are typically arranged in multiple levels on the hub axle.

SUMMARY OF THE INVENTION

In accordance with the present invention, a shifting arrangement for a change gear drive in multispeed hubs for bicycles is provided in which the control elements for the couplings of the sun gears include at least one trip cam rod, wherein the at least one trip cam rod is preferably disposed in at least one longitudinal slot of the hub axle. The at least one longitudinal slot can essentially be disposed coaxially to the hub axle, and the slot can be engaged by at least one pawl of the pawl-controlled change gear of the multispeed hub. The at least one trip cam rod can preferably have a first configuration or position which permits movement of the at least one pawl radially into the slot, thereby permitting engagement between a respective sun gear and the hub axle, and a second configuration or position for preventing engagement between the at least one pawl and the slot, thereby causing the respective sun gear to rotate about the hub axle. A control device can be provided to provide the appropriate control movements of the trip cam rod to either engage or disengage the sun gear with the hub axle.

A further description of the present invention is provided herebelow with reference to the accompanying figures. It should be understood that when the word "invention" is used in this application, the word "invention" includes "inventions", that is, the plural of "invention". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in a multi-speed hub for a bicycle having a frame and at least one wheel, the multi-speed hub for mounting the at least one wheel to the frame, the hub comprising: a shaft for being non-rotationally connected to the frame; input apparatus for inputting rotational power to the hub; sleeve apparatus disposed concentrically about the shaft apparatus for receiving rotational power from the input apparatus and transferring rotational power to the at least one wheel, the sleeve apparatus comprising apparatus for being connected to the at least one wheel; transmission apparatus disposed within the sleeve apparatus about the shaft apparatus for transferring the input rotational power from the input apparatus to the sleeve apparatus; the transmission apparatus comprising at least one sun gear rotatably disposed about the shaft apparatus, the at least one sun gear being rotatable in at least a first direction of rotation about the shaft apparatus, and the at least one sun gear being engageable with the shaft apparatus and disengageable from the shaft apparatus to provide at least two different speeds of the hub; the at least one sun gear comprising an inner portion disposed towards the shaft apparatus, and the at least one sun gear comprising at least one first member pivotably disposed on the inner portion of the at least one sun gear; the shaft apparatus defining a longitudinal axis, and the shaft apparatus comprising: at least one surface for engaging with the at least one first member in at least the first direction of rotation of the sun gear about the shaft apparatus to non-rotatably engage the at least one sun gear with the shaft apparatus; and apparatus for selectively inhibiting engagement of the at least one first member with the at least one surface; the apparatus for selectively inhibiting engagement being disposed before the at least one projection in the first direction of rotation, the apparatus for selectively inhibiting engagement being selectively pivotable between a first position and a second position, the first position for permitting engagement between the at least one first member and the at least one surface, and the second position for inhibiting engagement of the at least one first member with the at least one surface; the apparatus for selectively inhibiting engagement being selectively pivotable about a pivot axis, the pivot axis being substantially parallel to the longitudinal axis and offset radially from the longitudinal axis; and the hub additionally comprising apparatus for selectively pivoting the apparatus for selectively inhibiting engagement between the first and second positions.

Another aspect of the invention resides broadly in a bicycle having a frame, at least one wheel and a multi-speed hub for mounting the at least one wheel to the frame, the hub comprising: a shaft for being non-rotationally connected to the frame, the shaft having an outer periphery; input apparatus for inputting rotational power to the hub; sleeve apparatus disposed concentrically about the shaft apparatus for receiving rotational power from the input apparatus and transferring rotational power to the at least one wheel, the sleeve apparatus comprising apparatus for being connected to the at least one wheel; transmission apparatus disposed within the sleeve apparatus about the shaft apparatus for transferring the input rotational power from the input apparatus to the sleeve apparatus; the transmission apparatus comprising at least one sun gear rotatably disposed about the shaft apparatus, the at least one sun gear being rotatable in at least a first direction of rotation about the shaft apparatus, and the at least one sun gear being engageable with the shaft apparatus and disengageable from the shaft apparatus to provide at least two different speeds of the hub; the at least one sun gear comprising an inner portion disposed towards the shaft apparatus, and the at least one sun gear comprising at least one first member pivotably disposed on the inner portion of the at least one sun gear; the shaft apparatus defining a longitudinal axis, and the shaft apparatus comprising: at least one slot disposed longitudinally along the periphery of the shaft apparatus, the at least one slot comprising a surface for engaging with the at least one first member in at least the first direction of rotation of the sun gear about the shaft apparatus to non-rotatably engage the at least one sun gear with the shaft apparatus; and apparatus for selectively inhibiting engagement of the at least one first member with the at least one surface; the apparatus for selectively inhibiting engagement being disposed within the slot; the apparatus for selectively inhibiting engagement being selectively pivotable between a first position and a second position, the first position for permitting engagement between the at least one first member and the at least one surface by permitting the at least one first member to enter at least partially into the at least one slot, and the second position for inhibiting engagement of the at least one first member with the at least one surface by prohibiting the at least one first member from substantially entering into the slot; the apparatus for selectively inhibiting engagement being selectively pivotable about a pivot axis, the pivot axis being substantially parallel to the longitudinal axis and offset radially from the longitudinal axis; and the hub additionally comprising apparatus for selectively pivoting the apparatus for selectively inhibiting engagement between the first and second positions.

BRIEF DESCRIPTION OF THE DRAWINGS

The present invention is explained herebelow with reference to the exemplary embodiments of a shifting arrangement for a change gear drive in multispeed hubs as illustrated in the drawings, in which:

FIG. 6 shows the partial section according to FIG. 4 with the pawl lifted by a second profile of the trip cam rod;

FIG. 7 illustrates the partial section according to FIG. 4 with the pawl engaged with a web of the hub axle with a swivelled second profile of the trip cam rod;

FIG. 11 generally shows a bicycle and the components thereof.

DESCRIPTION OF THE PREFERRED EMBODIMENTS

Figure 1:
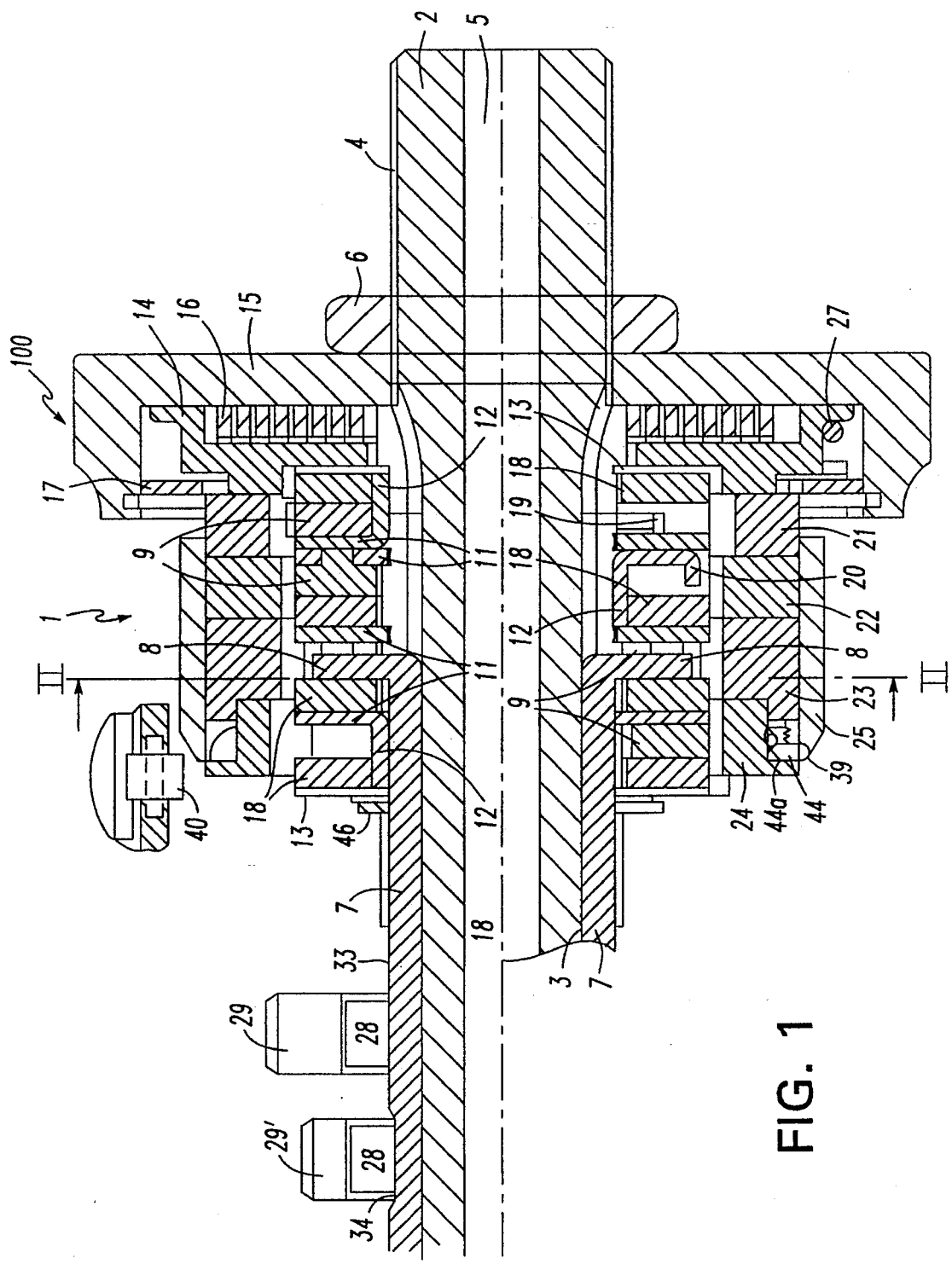
FIG. 1 illustrates a shifting arrangement with a fixed cone, a cable pulley, and four cam rings, as well as multiple control elements on a hub axle in cross-section on a plane coaxial to this axle.

A bicycle having a multi-speed hub 100 on a rear wheel 101 thereof is generally depicted in FIG. 11. Such a bicycle can essentially utilize the control arrangement in accordance with the present invention, and as discussed further herebelow. The hub 100 can have a hub axle 2, by means of which the hub 100 can be attached to a frame 103 of the bicycle. The frame 103 can also preferably support a front wheel 102. A chain 106 and pedal system 104, 105 can preferably be provided to transmit a drive power to the hub 100 and the rear wheel 101. The pedals 104 are preferably attached to a drive sprocket 105, the outside of which sprocket 105 preferably engages the chain 106. The chain 106 is also preferably engaged about the hub 100 by means of an additional drive sprocket 110. In addition to the above, a seat 107 can preferably be provided for the rider, while handlebars 108 can be provided for steering purposes. On the handlebars 108 there can also preferably be a gear shifting device 109 for shifting the gears of the multi-speed hub 100. The shifting device 109 can preferably be operatively connected to the hub 100 by means of cables 111 that are fastened along the frame 103 of the bicycle and preferably extend from the shifting device 109 to the hub 100. Such cables 111 and shifting devices 109 are typically well known and are therefore not discussed in any further detail herein.

In accordance with FIG. 1, the hub 100 is illustrated in greater detail. In FIG. 1, a shifting arrangement 1 for a change gear drive in multispeed hubs for bicycles is described. This shifting arrangement 1 can essentially be disposed on the end of the hub axle 2, and can preferably be disposed substantially concentrically around the hub axle 2. The shifting arrangement 1 represents an assembly unit on the hub axle 2. As such, the shifting arrangement 1 can be axially pushed onto the hub axle 2 and can be secured on the hub axle 2 by means of a nut 6 and a snap ring 46. Alternatively, other types of securing measures could be used, and variations on such could be well within the skill of the artisan.

Figure 2:
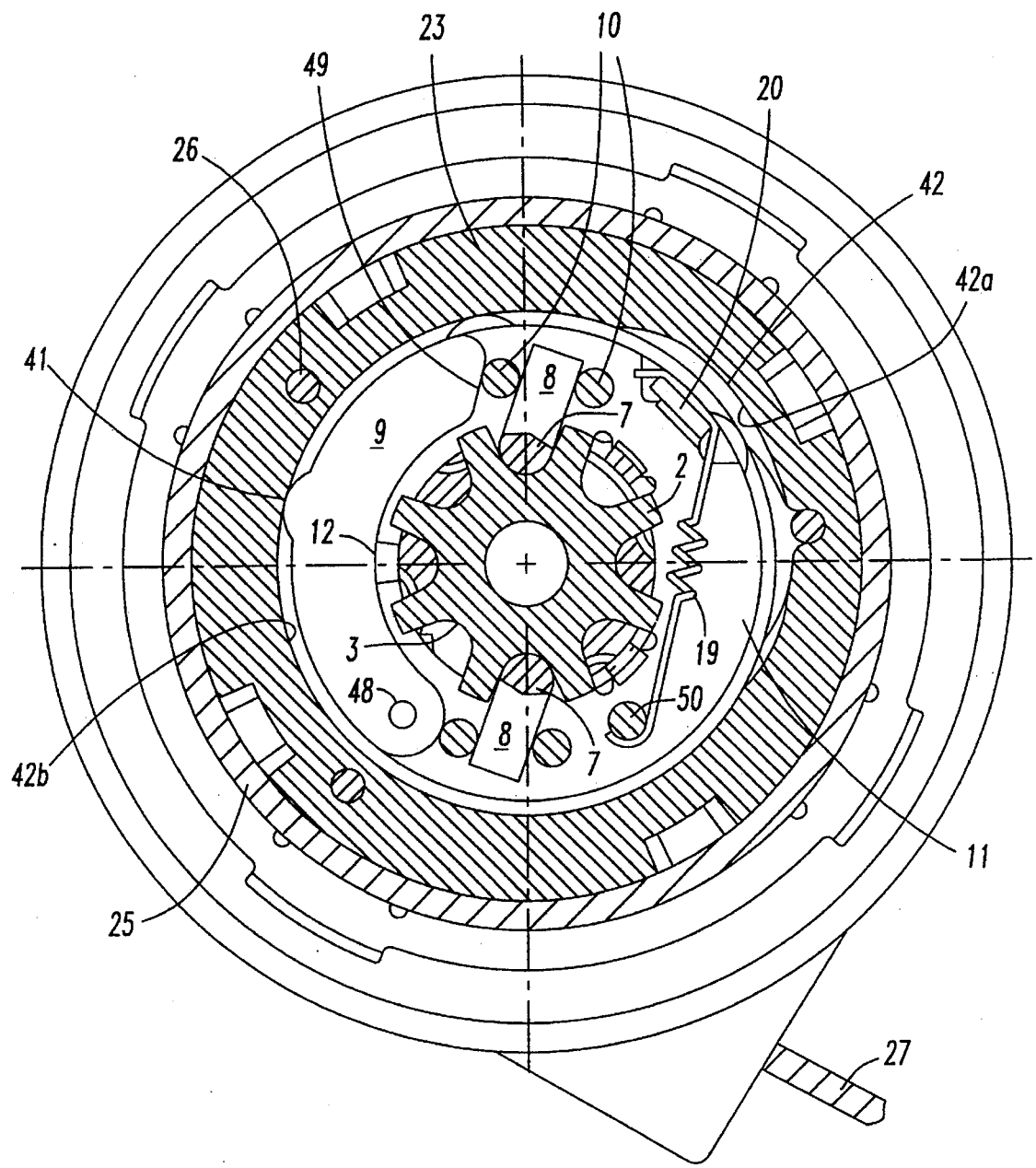
FIG. 2 shows the shifting arrangement in cross-section (II—II of FIG. 1) along a plane perpendicular to the hub axle with the control elements, comprising a cam lever, a trip cam rod, and a cam ring, as well as a connecting sleeve.
Figure 3:
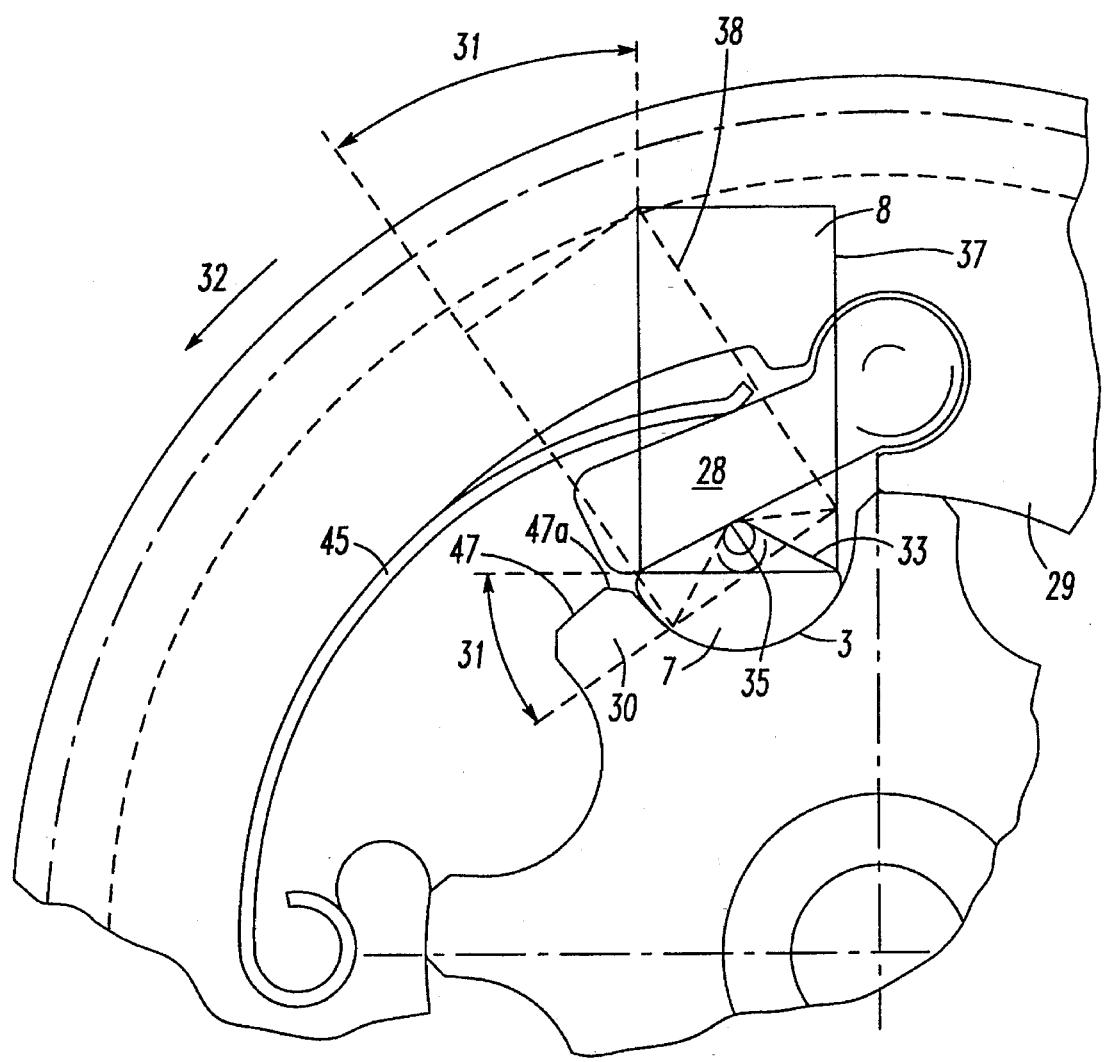
FIG. 3 shows a partial section perpendicular to the hub axle with a sun gear and a first profile of the trip cam rod which lifts a pawl.

In detail, the shift arrangement 1 can essentially include a fixed cone 15, a cable pulley 14, a guide plate 17, a first cam ring 21, a second cam ring 22, a third cam ring 23, a fourth cam ring 24, four plate cams 18, four cam levers 9, four bearing disks 11, as well as at least one thrust washer 13. FIG. 2 depicts a cross-section II—II of FIG. 1, taken perpendicular to the hub axle 2, through the third cam ring 23. As shown in FIG. 2, six trip cam rods 7 become visible, which rods 7 can be disposed in longitudinal slots 3 of the hub axle 2. The longitudinal slots 3 can each preferably be in a semicircular shape and can extend coaxially from the shifting arrangement 1 in the direction of the change gear drive of multiple speed hub 100. A further description of a change gear mechanism is provided further herebelow with reference to FIGS. 10a and 10b. Between the longitudinal slots 3, a web 30 can be disposed as shown in FIG. 3.

On a respective end of each of the trip cam rods 7, which end extends into the shifting arrangement, a hook 8 can be formed. This hook 8 can preferably be bent at a right angle to the longitudinal dimension of the rods 7, and can, in each case, be guided by two engaging pieces 10.

The trip cam rods 7 transfer the control movements of the shifting arrangement 1 into the change gear drive (not shown here in detail) of the hub 100. The change gear drive, can essentially have, in a plurality of planes parallel to one another and perpendicular to the hub axle 2, at least two sun gears 29, 29'. Within the sun gears 29, 29', swivellable pawls 28 can preferably be disposed in a known manner. The pawls 28 can be spring-loaded radially inwardly and away from the interior of the sun gears 29, 29', by means of a spring 45 (see FIG. 3). As such, a coupling can be formed, which coupling can be active in a direction of rotation 32 against the web 30 in each case, whereby the webs 30 run coaxially to the hub axle 2 and whereby the flanks of the webs 30 are formed by the longitudinal slots 3. All webs 30 are the same height and form the outer diameter of the hub axle 2 with their circumferential surfaces 47. Between the contour of the longitudinal slots 3 and the circumferential surfaces 47, a bevel 47a can be formed in each case. The bevels 47a can be made in particular on the side of the webs 30 which is engaged by the pawls 28.

The trip cam rods 7 can each preferably have along a substantial portion of the length thereof and disposed radially outwardly, a first profile 33. This first profile 33 can essentially be shaped substantially triangular along the radially outer surface, or in other words, can be shaped like a roof, whereby a ridge 35 (see FIG. 4) of the roof defines a radius midpoint for the contour of the longitudinal slot 3. FIG. 3 depicts the orientation of the pawl 28 with respect to the web 30. In general, in conjunction with the first profile 33, it can be seen that that the pawl 28 essentially cannot come into contact with the web 30 during rotation in the direction of rotation 32, but is instead held away from the web 30 by means of the first profile 33. As generally depicted in the figures, the angle of the roof can essentially be between about 120 degrees and about 140 degrees, and can preferably be about 130 degrees. A similar angle measured from the peak 35 of the roof to each of the adjacent surfaces 47 can essentially be about 170 degrees, thereby enabling the trip cam rod 7 to be pivoted within the slot 3 while remaining substantially entirely within the slot 3. Thus, the trip cam rods can essentially pivot between about 30 degrees to about 50 degrees, and preferably about 40 degrees.

Figure 9:
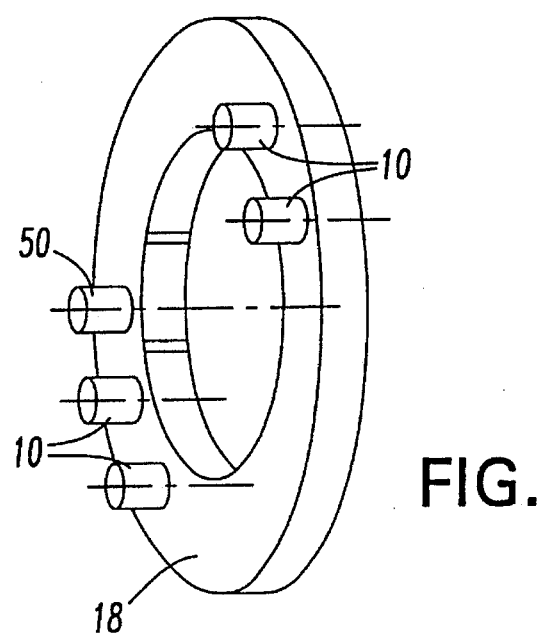
FIG. 9 shows a perspective view of a bearing disk with engaging pieces to control movement of the trip cam rods.

As likewise illustrated in FIG. 3, the trip cam rods 7 can be swivellable by an angle 31 to allow for a coupling, as described further herebelow, between the pawls 28 of the sun gears 29, 29' with the webs 30. A first shift position 37 of the hook 8 is defined as one extreme position and a second shift position 38 (shown by dashed lines) of the hook 8 is defined as the other extreme position. Movement of the hook 8 between the two extreme positions 37, 38 can essentially be achieved by rotation of a cam plate 18 relative to the axle 2. On each cam plate 18 there can preferably be engaging pieces 10 as shown in FIG. 9, which pieces 10 are preferably disposed pointing in an axial direction away from the cam plate 18. Two of the pieces 10 are essentially disposed to receive the hook 8 in the center therebetween. Then, upon rotation of this cam plate 18, the hook 8 is essentially pivoted through the angle 31, to thereby rotate the cam rods 7 in the slots 3.

Figure 4:
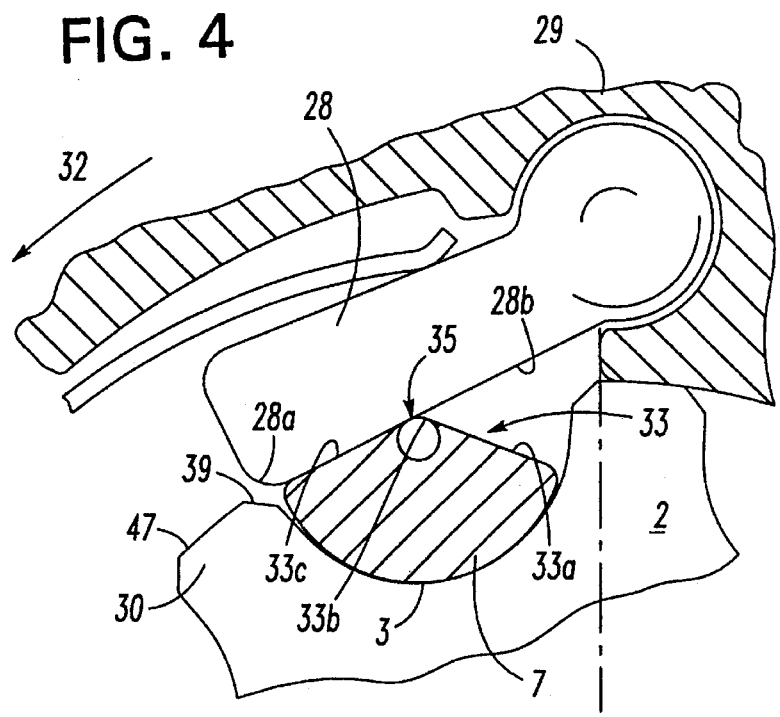
FIG. 4 further illustrates the partial section according to FIG. 3, with the trip cam rod, the sun gear, and the pawl lifted by the first profile.
Figure 5:
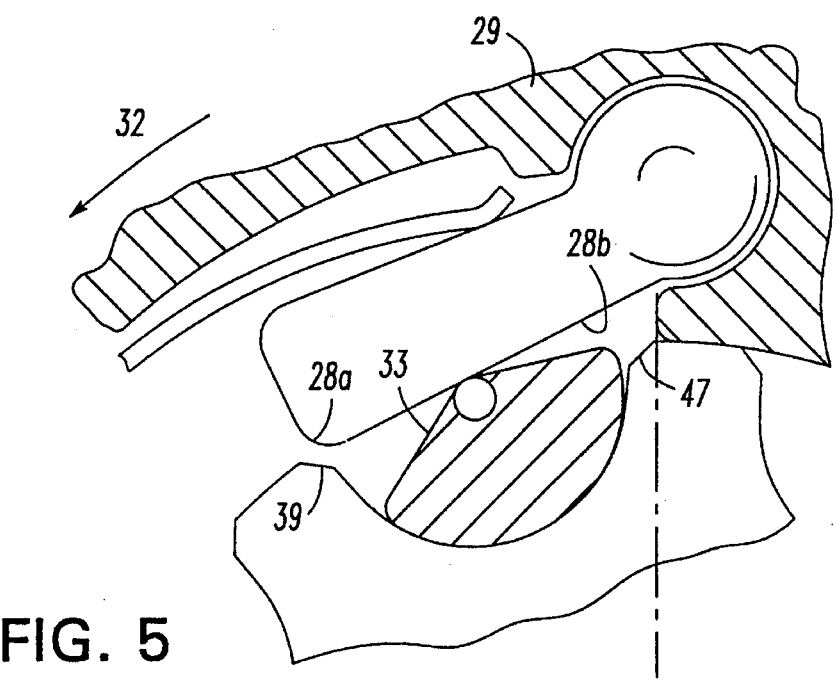
FIG. 5 shows the partial section according to FIG. 4, likewise with lifted pawl on the rotated first profile of the trip cam rod.

The rotation of the first profile 33 of the trip cam rods 7 is illustrated in FIGS. 4 and 5, wherein the pawls 28 are essentially moving in the direction of rotation 32. Thus, upon approaching a slot 3 with a cam rod 7 disposed therein, a pawl 28 would be able to minimally enter the slot 3 until the pawl 28 engages a first surface 33a of the profile 33. Because of the orientation of the first surface 33a the pawl 28 will then essentially run up on the surface 33a to the surface 33b of the ridge 35 of the first profile 33, and after passing the ridge 35 is guided along a surface 33c of the second half of the roof of the first profile 33 and then over the web 30.

According to FIG. 5, with the control rod 7 in the second limit position, the pawl 28 would likewise be guided along the first surface 33a to the ridge 35 of the first profile 33, but in this case, without swivelling radially inward into the groove 3, since the contact surface 33a of the first half of the roof of the first profile 33 roughly approximates the circumferential surface 47 of the hub axle 2. With continued rotation in the direction of rotation 32, the pawl 28 cannot consequently push against the web 30, since the ridge 35 slips along on a side wall 28b of the pawl 28, and, if the need be, guides the edge 28a of the pawl 28 to the bevel 39, whereby the pawl 28 would then be repelled radially outwardly and would not engage the web 30.

Since the web 30 essentially cannot be provided with arbitrarily large bevels 39, it is recommended to also shape the profile of the pawls 28 such that the edge 28a to the pawl 28 running into the web 30 has a rounding or a bevel which provides a transistion into the radially inward facing side wall 28b of the pawl 28 and repels the pawl 28 on the web 30 and/or its bevel 39.

It can thereby be seen that the two extreme positions of the first profile 33, and any positions thereby between, can repel the pawl 28 radially outwardly to inhibit engagement of the pawl 28 with the webs 30. Thus, a control element disposed on the hub axle 2, prependicular to the slip path of pawl 28, has been discovered which is practical without great design precautions. In essence, the first profile 33 of a trip cam rod 7 can extend through arbitrarily many sun gears, thereby inhibiting engagement of each of the encirculating sun gears with the web 30. In essence, the first profile 33 can extend along essentially the entire length of the trip cam rod 7 with the exception of the location of the second profile 34, which second profile 34 can be located in the plane of the one sun gear which is to be coupled and released via the second profile 34 (FIGS. 6 and 7) with hub axle 3. In the depicted embodiment, this sun gear is depicted as 29'. Thus, each of the different trip cam rods 7 can have a second profile 34, and the second profile 34 of each of the trip cam rods 7 can be diposed at a position corresponding to at least one sun gear, with different trip cam rods 7 corresponding to different sun gears. The position of the second profile 34 can thus essentially be within one of the sun gears, thereby permitting different ones of the trip cam rods 7 to control different ones of the sun gears.

The second profile 34, in this case disposed under the sun gear 29' on the trip cam rod 7, can in essence, still cause, in the first shift position 37 according to FIG. 6, the pawl 28 to be repelled during rotation of the sun gear 29' in the direction of rotation 32. In this first shift position 37 (see FIG. 3), as the pawl 28 reached the longitudinal slot 3, the pawl 28 would essentially dip partially into the slot to the surface 34a, at which point further rotation of the sun gear 29° would cause the pawl to ride along surface 34a, radially outwardly due to the outwardly radial angled path of the second profile 34. The pawl 28 would thereby be diverted over the web 30. Only after the swivelling of the trip cam rod 7 by the angle 31 (FIG. 3) into the second shift position 38, does the second profile 34 function as a guide bevel for enabling the pawl 28 to enter essentially fully into the longitudinal slot 3 to engage against the web 30, as shown in FIG. 7.

In the case of the exemplary embodiment depicted, the hub axle 2 has eight longitudinal slots 3, and can therefore have the same number of trip cam rods 7. Thus, in view of the above description, it could be possible to service eight sun gear planes, by providing each of the rods 7 with a second profile 34 corresponding to one of the sun gears. Then it would be possible for each respective sun gear would be able to engage with a web 30 at only a single position through the 360° rotation, or revolution of the sun gear about the axle 2. However, since this would result in relatively high backlash angles in the drive train, wherein a rotation of about 360° could occur without any sun wheel engagement, in this exemplary embodiment of a coupling to be shifted in the desired sun gear plane, two oppositely disposed trip cam rods 7 can preferably be identical, so that each sun gear 29, 29' would then have the possibility, twice per revolution, of engaging and pushing against a web 30 of the hub axle 2, if the control from outside requires this. It is, consequently, obvious that with this arrangement four sun gear planes could be serviced.

The shifting arrangement 1 transforms the control movement of the bicycle rider into the swivelling movement of the trip cam rods 7 as follows: With a control element (not shown here but see 109 in FIG. 11) a cable 27 (similar to 107 in FIG. 11) can be pulled and thus the control movement can be introduced into the cable pulley 14 on which the cable 27 can be coiled. The cable can preferably be connected by its end to the cable pulley 14 so that upon pulling on the cable 27, the cable pulley 14 can be rotated. A retracting spring 16 can be provided to return the cable pulley 14 to its original position upon reduction of the control movement. Alternatively, it might be possible that a sufficiently stiff cable would be sufficient for return of the cable pulley 14 to its original position simply by pushing the cable pulley 14 in the reverse direction of rotation, and thus, a spring 16 might not be necessary in at least one alternative embodiment of the invention.

The first cam ring 21, the second cam ring 22, the third cam ring 23, and the fourth cam ring 24 can be non-rotationally connected with the cable pulley 14 by at least one screw 26 (see FIG. 2), and together, in essence, form a tubelike housing with four cam paths 42. Inside each cam path 42, a cam lever 9 can be disposed for interacting with the cam path 42. Each cam lever 9 can essentially have a curved sickle-shape, and can therefore be introduced into the remaining annular space between hub axle 2 and the respective cam ring, 23 in FIG. 2. The cam lever 9 can be attached swivellably by means of a bolt 48 and can have, on the external radius of curvature, approximately in the middle region, a cam 41 which interacts with the cam path 42.

Each cam path 42 can preferably have a radially outward projecting recess 42a while the rest of the cam surface 42b can essentially be cylindrical. Thus, as the cam 41 follows the cam surface 42, the surface 42b would essentially hold the cam lever 9 inwardly. When the cam surface 42a passes adjacent the cam 41, the cam 41, and cam lever 9 can pivot outwardly. Thus, a surface 49, on the end of the cam lever 9 opposite the bolt 48, gives way and enables the engaging pieces 10, which are in contact with this surface 49, to follow the surface 49. Since the hook 8 is engaged between the engaging pieces 10, the hook 8 can be moved from the first shift position 37 into the second shift position 38.

The bolt 48 attaches the cam lever 9 to the bearing disk 11, which bearing disk 11 is non-rotatably connected with the hub axle 2 by means of positioning noses 12, in the longitudinal slots 3. The engaging pieces 10 are connected to the plate cam 18, whereby the plate cam 18 can have an additional pulling pin 50, in which a spring 19 can be suspended. The spring 19 can essentially generate tractive force between itself and a spring bracket 20, which spring bracket 20 is disposed on the bearing disk 11. Thus, a relative twisting of the bearing disk 11 and the plate cam 18 can be generated, which twisting occurs when the surface 49 of the cam lever 9 recedes. In essence, it is the spring force of this spring 19 which applies a rotational force to the plate cam 18, thereby causing the engaging pieces 10 to bear against the surface 49 of the cam lever 9, and thus, ultimately applying the force to the cam lever 9 to cause the cam 41 to follow the cam path 42.

Thus, since the cam rings 21–24 are non-rotationally coupled to the cable pulley 14, a pulling force on the cable 27 would cause the cam rings 21–24 to rotate about the hub axle 2, thereby relatively rotating the cam paths 42 with respect to the corresponding cam levers 9 and cams 41. By positioning the different cam levers at positions which are rotationally offset from one another on each of the cam rings 21–24, such as possibly offset by about 60° and aligning the cam surfaces 42a of each of the cam rings 21–24, the cam levers 9 and cams 41 can interact with their respective offsets surfaces 42a upon different degrees of rotation of the cam rings 21–24 about the hub axle 2. Thus, each cam ring 21–24 can act on its cam lever 9 and guide the second profile 34 for the pawl 28 of each sun gear plane to precise shifting processes through engagement and disengagement of the couplings by means of the surfaces 49, the engaging pieces 10, and the respective hooks 8 of the respective trip cam rods 7.

In other words, in a rest position of the cable pulley 14 and cam rings 21–24, each of the cam levers 9 could preferably be held radially inwardly by a surface 42b of a cam path 42, and as such, each trip cam rod 7 could be in its first position 37. Then, by pulling on the cable 27, the cam pulley 14 and cam rings 21–24 could be rotated by about 60°, at which point, a cam lever 9 corresponding to cam ring 21 might move radially outwardly into the space 42a of cam ring 21, thereby causing a first set of trip cam rods 7 to pivot from their first position 37 to their second position 38, to allow a first sun gear to engage with the hub axle 2. Upon a further rotation of the cable pulley 14 and cam rings 21–24 possibly by another 60°, the cam lever 9 of cam ring 21 would be pivoted radially inwardly to rotate the trip cam rods back to the first position 37, and a second cam lever 9 corresponding to cam ring 22 could possibly pivot outwardly, thereby causing a second set of trip cam rods 7 to move from the first position 37 to the second position 38 to enable a second sun gear to engage with the hub axle 2. In a similar manner, another 60° rotation could possibly then allow a third sun gear to engage the hub axle 2 via cam ring 23 and its corresponding cam lever 9, and a still further 60° rotation could permit a fourth sun gear to engage the hub axle 2 via the cam ring 24 and its corresponding cam lever 9. A reversal of rotation of the cable pulley 14 and cam rings 21–24 could cause a similar chain of events, but in reverse to those described above.

Figure 8:
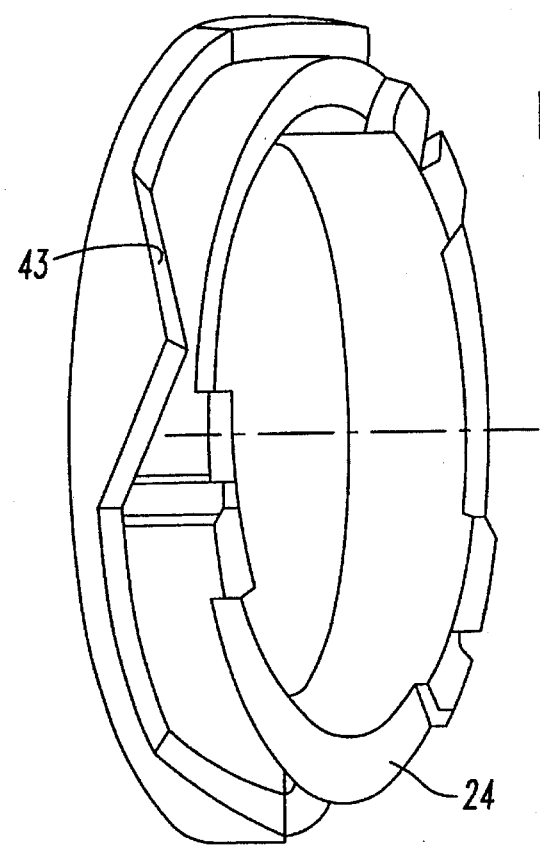
FIG. 8 shows a perspective view of a cam ring with an axial curve to control a sliding arrangement of a connecting sleeve.

It has been determined that it can be advantageous to place controllable pawl couplings on larger diameters in the change gear drive of the hub 100 such that the division of the flow of forces into two directions is made easier, whereby the number of speeds of the change gear drive can then also be increased. Such a pawl coupling 40 is depicted in FIG. 1. Control of pawl coupling 40 can essentially not be performed through the prescribed disposition of the control elements. For this case, a connecting sleeve 25 can be provided with a sliding arrangement 44 and a bevel 39, which connecting sleeve 25, with axial shifting of the connecting sleeve 25 moves under the pawl coupling 40 and lifts the pawl coupling 40 radially outwardly. The connecting sleeve 25 can thus be axially movable by an axial cam surface, or curve 43, and protected against twisting and can be moved back and forth by the sliding arrangement 44 according to the axial curve 43 (see FIG. 8). A biasing device 44a can be provided for biasing the sliding arrangement 44 into engagement with the curve 43. Thus, the proper design of the cam paths 42 and the curves 43 can preferably result in an advantageously coordinatable choice of many speed levels, which can be graduated advantageously and can be controlled in the proper sequence.

A further understanding of the functioning of the pawl coupling 40 can be better understood in view of the following description of an embodiment of an essentially complete bicycle hub which could be configured with the control elements in accordance with the present invention.

Figure 10A:
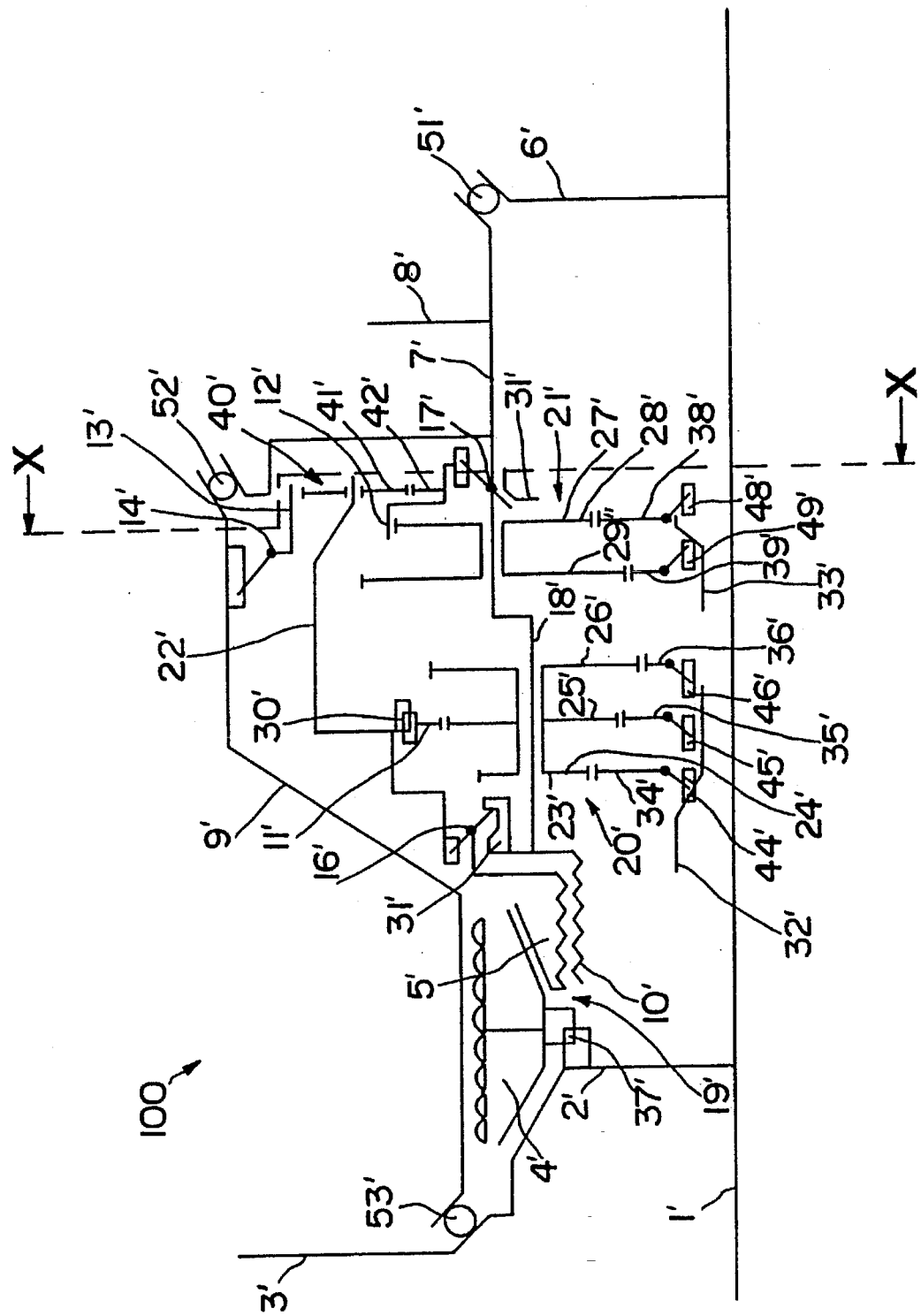
FIGS. 10a and 10b schematically show possible embodiments of a hub and the gearing components thereof in which the control elements of the present invention can be incorporated.
Figure 10B:
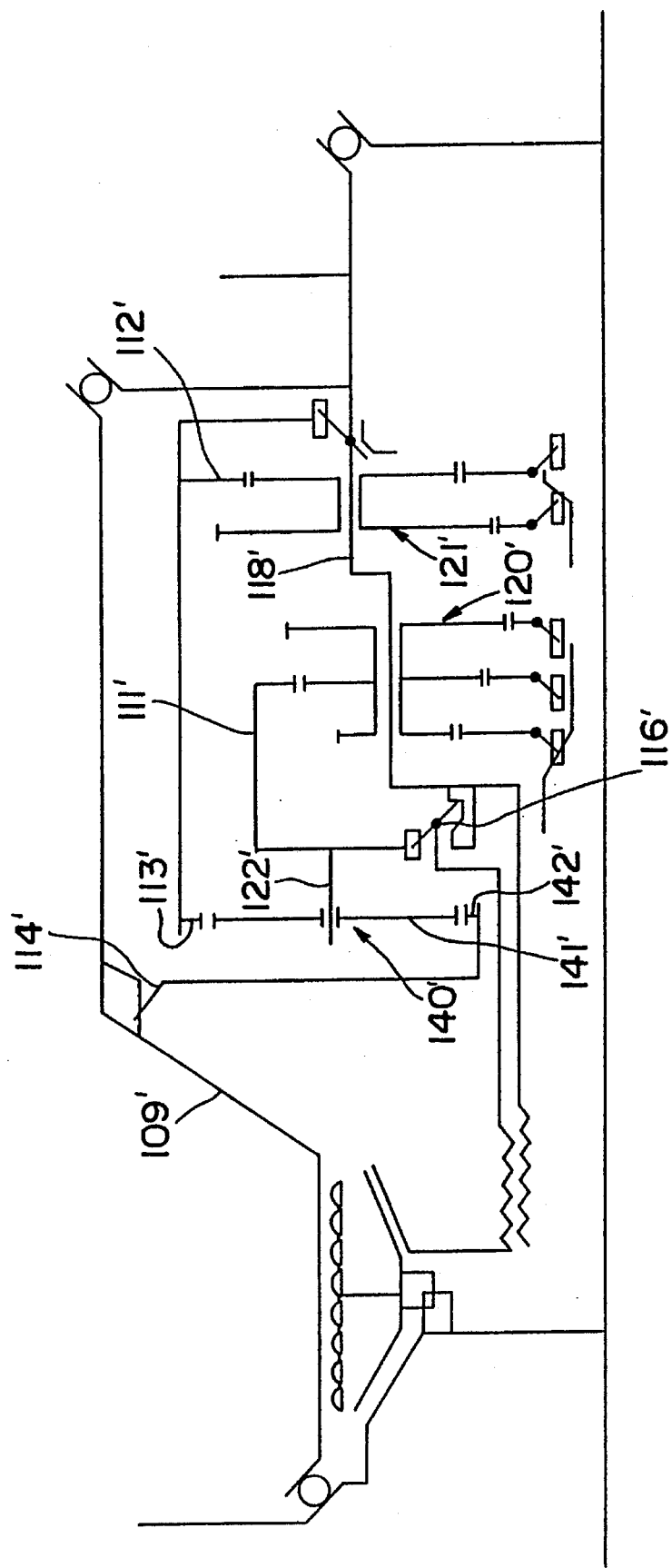
Figure 10C:
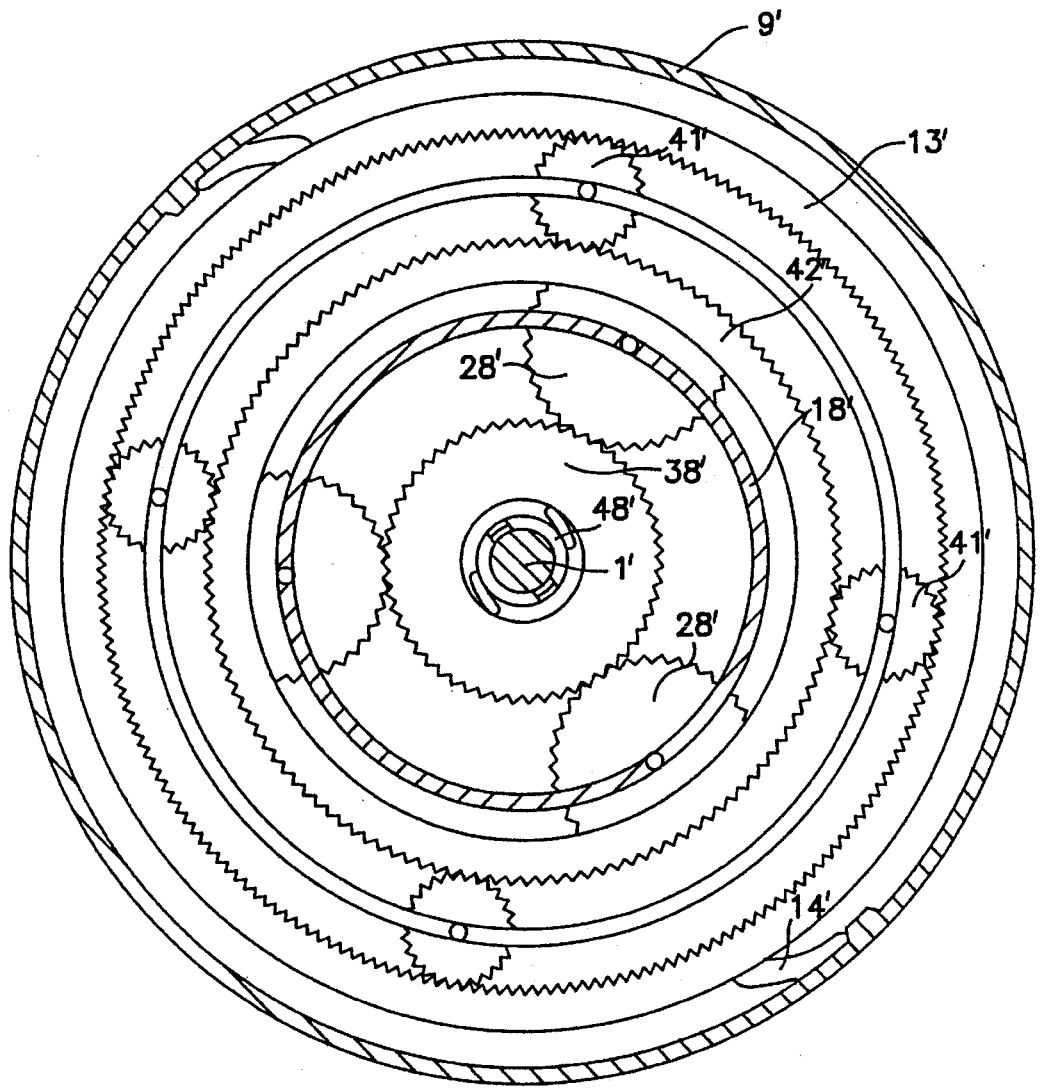
FIG. 10c shows a representative sectional view through the hub of FIG. 10a along the line X—X.
Figure 10B:
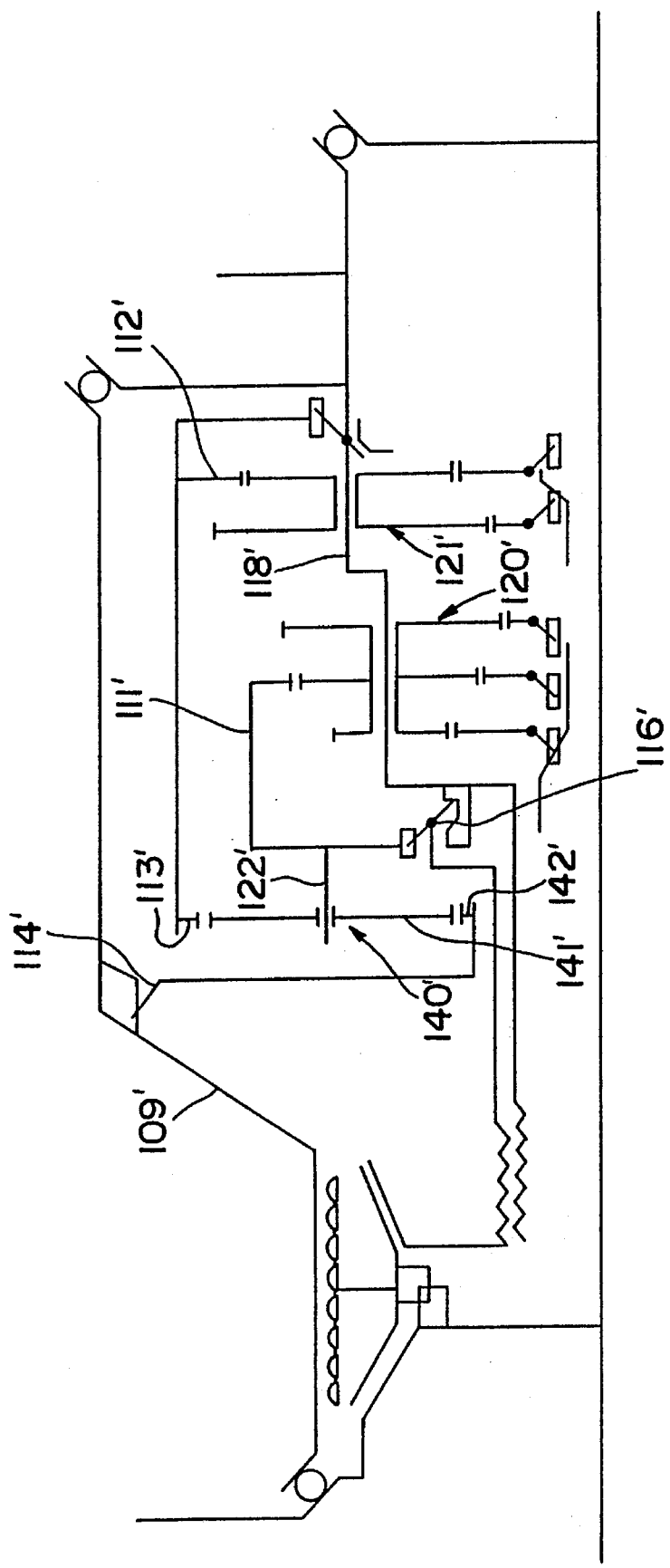

A multi-speed hub 100 will now be further explained with relation to FIGS. 10a, 10b and 10c. As schematically illustrated in FIG. 10a, within the hub 100, there can preferably be a hub shift transmission. The hub 100, and thus the hub shift transmission, can essentially be connected to the bicycle frame by means of a hub axle 1'. A lever cone 2' can preferably be fastened non-rotationally to the hub axle 1', and can preferably be fixed in the axial direction on the hub axle 1'. A lever 3' of the lever cone 2' can be braced against the bicycle frame 103 (see FIG. 11) to further ensure a torsional strength of the hub 100. Preferably rigidly connected to the side of the hub axle 1' opposite the lever cone 2' there can be a fixed cone 6', which by means of a first bearing 5' can provide the bearing base for a driver 7'. On the driver 7', a driving pinion 8' can preferably be non-rotationally mounted. Such a driving pinion 8' can preferably comprise the sprocket 110 (as discussed above with reference to FIG. 11).

On the largest diameter of this driver 7' there can preferably be a second bearing 52' to connect the driver 7' with a hub sleeve 9'. In addition, the hub sleeve 9' can preferably be braced against the lever cone 2' by means of a third bearing 53'. The driver 7' can preferably be non-rotationally connected to a first planetary carrier 18', on which a first multi-stage planet wheel 23' and a second multi-stage planet wheel 27' are preferably rotationally mounted. The first multi-stage planet wheel 23' essentially can belong to a first planetary gear set 20' with a first ring gear 11' and at least one sun wheel, wherein sun wheels 34', 35' and 36' are shown. The second multi-stage planet wheel 27' essentially can belong to a second planetary gear set 21' with a second ring gear 12' and at least one additional sun wheel, wherein sun wheels 38' and 39' are shown.

In the case of the embodiment shown in FIGS. 10a and 10c, the first multi-stage planetary gear set 20' can preferably be a three-stage gear set, and the first multi-stage planet wheel 23' can comprises the stages 24', 25' and 26' of increasing diameter. In the second multi-stage planetary gear set 21' the second multi-stage planet wheel 27' can analogously have at least two stages 28' and 29" of increasing diameter. The corresponding sun wheels 34', 35', 36', 38' and 39', located around the hub axle 1', can be connected to the hub axle 1' by means of free wheels 44', 45' 46' 48' and 49'. These free wheels 44', 45' f 46', 48' and 49' are preferably rotatable in only one direction of rotation, and can preferably have a blocking device for blocking rotation in the opposite direction.

The free wheels 44', 45', 46', 48' and 49' can preferably be actuated along the hub axle 1' from outside the hub shift transmission by means of suitable control units 32' and 33'. In general, such control units can be actuated by means of the shifting mechanism 109, as discussed earlier with reference to FIG. 11, and the cables 111, 27 (FIGS. 11 and 2). By means of the shifting mechanism 109 (see FIG. 11) and the control units 32' and 33', various gear ratios can essentially be achieved inside the hub shift transmission by selectively activating or deactivating the free wheels 44', 45', 46', 48' and 49'. In at least one embodiment of the present invention, such selection or actuation of the free wheels 44', 45' 46' 48' and 49' can essentially comprise connecting the free wheels 44', 45', 46', 48' and 49' to the hub axle 1' to be held non-rotationally by the hub axle 1'.

In at least one embodiment of the present invention, one type of device by means of which the free wheels 44', 45', 46', 48' and 49' can be connected to the hub axle 1' was described above in relation to FIGS. 1–9.

FIG. 10b illustrates a variant of the hub shift transmission shown in FIG. 10a. In essence, for purposes of simplicity, FIG. 10b has labels only for parts and/or elements of this hub shift transmission which differ from those of the hub shift transmission shown in FIG. 10a, but have a similarity in terms of function or appearance. These parts are identified with numbers which are greater by 100 than the numbers used in FIG. 10a. The remaining unnumbered parts are essentially the same as the parts labelled in FIG. 10a, and thus, any reference herebelow to unlabelled elements of FIG. 10b can essentially be referred to in FIG. 10a.

In FIG. 10b, the arrangement of the hub axle 1', the lever cone 2' with the lever 3' the fixed cone 6' the first multi-stage planetary gear set 20', the second multi-stage planetary gear set 21' and also the sun wheels 34', 35', 36', 38' and 39' with their free wheels 44', 45', 46', 48' and 49' on the hub axle 1', essentially corresponds to the arrangement described above with respect to FIG. 10a. The driver 7' can likewise be braced against the fixed cone 6' by means of the first bearing 51' and against a modified hub sleeve 109' by means of the second bearing 52', which hub sleeve 109' can preferably roll along the lever cone 2' by means of the third bearing 53'. The driver 7' can preferably be non-rotationally connected with a first planetary carrier 118', on which the first multi-stage planet wheel 23' and the second multi-stage planet wheel 27' can preferably be rotationally mounted. The first multi-stage planet wheel 23' essentially belongs to a first planetary gear set 120' with a first ring gear 111' and the sun wheels 34', 35' and 36'. The second multi-stage planet wheel 27' essentially belongs to a second planetary gear set 121' with a second ring gear 112' and with sun wheels 38' and 3'. In the case of the embodiment illustrated in FIG. 10b, the first multi-stange plantary gear set 120' can also preferably be a three-stage gear set, and the first multi-stage planet wheel 23' can comprise the stages 24', 25' and 26'. In the second planetary gear set 121', the second multi-stage planet wheel 27' can analogously have at least two stages 28'and 29''.

As indicated in FIG. 10a, the free wheels 44', 45' and 46' of the sun wheels 34', 35' and 36' are preferably oriented in the opposite direction of rotation from the free wheels 48' and 49' of the sun wheels 38' and 39', where the sun wheels 34', 35' and 36' can preferably freewheel backward on the hub axle 1', and the sun wheels 38' and 39' can preferably freewheel forward.

Now, with reference to both FIGS. 10a and 10b, one clutch device 16' and one clutch device 1', each acting in a single direction of rotation, can preferably be located on the planetary carriers 18', 118' on both sides of the planetary gear sets 20', 120' and 21', 121', when viewed axially. The clutch device 16' preferably drives in the driving direction of rotation, and the clutch device 17' preferably drives in the reverse direction of rotation. The driving side clutch device 17' preferably interacts with the second ring gear 12', 112' and the lever-cone-side clutch device 16' preferably interacts with one of the second planetary carriers 22', 122', whereby in the variant illustrated in FIG. 10a, this clutch device 16' can preferably be non-rotationally connected to the second planetary carrier 22', via the ring gear 11' by means of a dog clutch 30'. In the variant illustrated in FIG. 10b, the first planetary carrier 118' essentially interacts directly with the first ring gear 111' via the clutch device 116', which ring gear 111' can again be connected to a second planetary carrier 122'.

With reference to FIGS. 10a and 10b, the second planetary carrier 22', 122' can essentially be an integral component of a differential planetary gear set 40', 140'. This differential planetary gear set 40', 140' can preferably have at least a one-stage differential planet wheel 41', 141', a differential ring gear 13', 113' and a differential sun wheel 42', 142'. As shown in FIG. 10a, the differential ring gear 13' can preferably interact with the hub sleeve 9' via a clutch device 14', which clutch device 14' preferably engages in the driving direction of rotation and can preferably freewheel in the reverse direction of rotation. In the variant illustrated in FIG. 10b, the differential sun wheel 142' is preferably mechanically connected to the hub sleeve 109' by means of a clutch device 114', which clutch device 114' can preferably be engaged in the driving direction of rotation and can preferably freewheel in the reverse direction. In at least one possible embodiment of the present invention, the clutch device 14' or 114' could essentially correspond to the pawl 40 as described above with reference to FIGS. 1–9.

The first planetary carrier 18', 118', in at least one embodiment of the present invention, can preferably have a threaded portion 10' on its lever-cone-side end, onto which threaded portion 10' a brake cone 5' can be screwed. The threaded portion 10' can essentially be realized as a right-handed thread with a steep thread pitch so that the brake cone 5', the rotation of which can be restricted by a friction not indicated here, moves to the driving side to the block position when the first planetary carrier 18' rotates in the driving direction of rotation, and, when the first planetary carrier 18' rotates in the reverse direction, moves in the direction of the lever cone 2' toward a brake system 19'. This brake system 19' preferably includes a brake shell 4' which can be made up of a number of parts, and which can be moved outward against the hub sleeve 9' for the generation of frictional forces when one of the bevels of the brake cone 5' slips under the brake shell 4'. This brake shell 4' can preferably be braced against the lever cone 2' and can transmit its rotational forces to the lever cone by means of an interlocking member, or dog clutch 37'. The rotational forces are preferably supported against the frame 103 (FIG. 11) of the bicycle by means of the arm 3', thereby essentially prohibiting rotation of the brake cone 5' during a braking action, or, in other words, during a frictional engagement of the brake cone 5' with the hub shell 9'.

The clutch device 16', 116' connected to the first planetary carrier 18', 118' can preferably be actuated by means of a lifting apparatus 31', whereby this actuation functions automatically when moving backwards, or in other words, during a backpedalling, or braking action. If none of the sun wheels 34', 35' and 36' are located on the hub axle 1' the clutch device 16', 116' can preferably generate an additional direct speed, as can preferably the clutch device 17' on the second planetary gear set 21'.

The cyclist can preferably use the liftable free wheels 44', 45', 46', 48' and 49', as well as the liftable clutch device 14', to manually select the individual speeds from the outside. Consider the first planetary gear set 20', 120', the function of which is essentially to drive a first ring gear 11', 111'. The free wheels 44', 45' and 46' can preferably be sequentially lifted by means of the first control unit 32'. In at least one embodiment of the invention, the control unit could possibly be a trip cam rods 7 disposed within a longitudinal slot 3 (see FIGS. 1 and 2).

For example, if the free wheels 44' and 45' are blocked, or lifted, the first planetary gear set 20', 120' can interact with the first ring gear 11', 111' via the free wheel 46' via the sun wheel 36' via the third stage 26' of the first multi-stage planet wheel 23' via the second stage 25'. If the first control unit 32' is retracted, the free wheel 45' can preferably engage and support the sun wheel 35' against the hub axle 1'. By means of the different speeds of the sun wheels 35' and 36', the speed the engaged sun wheel 35' overtakes the freewheel 46', and the flow of force is via the free wheel 45', the sun wheel 35', the second stage 25' of the first multi-stage planet wheel 23' to the first ring gear 11', 111'. Finally, if the first control unit 32' is further retracted so that the free wheel 44' is able to rest against the hub sleeve axle 1', the two free wheels 45' and 46' are outrun and the sun wheel 45' rests against the hub axle 1'.

However, if the free wheels 44', 45' and 46' are lifted out (i.e., if the control unit 32' was possibly returned to the right), the clutch device 16', 116' can preferably be active in the drive direction with respect to the first ring gear 11', 111', thereby providing a direct connection between the first planetary carrier 18', 118' and the ring gear 11', 111'. In essence, the clutch device 16', 116' would always be engaged in the drive direction, but when there is a connection between at least one of the freewheels and the hub axle 1', the clutch device 16', 116' would be outrun. This clutch device 16', 116' could preferably be in the form of a spring biased pawl clutch in at least one embodiment of the present invention, whereby the pawls can be biased outwardly to engage the inside of the ring gear 11', but when being outrun, the pawls can be depressed inwardly. Such clutch devices are essentially well known and will therefore not be discussed in any further detail herein.

As should essentially be clear from the configurations described above, there can thus preferably be four possible speeds with a three stage planetary gear 23'. (For planetary gears having an alternative number of stages, the number of gears would essentially equal the number of stages plus one.) With the depicted embodiment of three stages, first, all three free wheels 44', 45' and 46' can be lifted out, thereby producing a direct drive by means of the clutch device 16', 116'. Then the two free wheels 44' and 45' can be lifted out producing drive via the first stage 26'. Then only the free wheel 44' can be lifted out producing drive via the second stage 25', and finally, when the control is removed and the free wheel 44' is able to rest against the hub axle 1', the drive would be provided by means of the third stage 24', during which configuration, the free wheels 45' and 46', as well as the clutch device 16' would be outrun.

The second planetary gear set 21' preferably includes two free wheels 48' and 49' and the clutch device 17'. Instead of actuating both free wheels 48' and 49' by means of the second control unit 33', which could easily be done, the free wheel 49' and the clutch device 17' of the variants shown in FIGS. 10a and 10b can be actuated automatically, and the free wheel 48' can preferably be made to operate automatically. In a manner similar to that described above for the first planetary gear set 20', 120', the second planetary gear set 21', 121' can preferably produce three speeds (one more than the number of gear stages of the planet wheel 27'). This second planetary gear set 21', 121', can preferably be provided to drive the second ring gear 12', 12' which can be rigidly connected to a differential sun wheel 2'.

With this second planetary gear set 21', 121', a direct speed can preferably be achieved by lifting the lifting device 31' at the clutch device 17', thereby engaging the clutch device 17' to provide a direct connection between the first planetary carrier 18', 118' and the second ring gear 12', 112'. In this case, the engaged free wheels 48' and 49' would be outrun. The next fastest speed is produced by lifting the clutch device 17' to disengage the clutch device 17', and lifting the free wheel 49', whereby the free wheel 48' can then drive. The fastest translation ratio can preferably be achieved by lifting the lifting device of the free wheel 49', thereby engaging the free wheel 40', so that the free wheel 49', can also be driven, as a result of which the free wheel 48'would be outrun. The clutch device 17' must remain raised, or disengaged.

As mentioned above, the free wheels 44', 45' and 46', as well as the clutch device 14', 114', and 16', 116' preferably block forward relative to the driver 7', while the free wheels 40' and 49', as well as the clutch device 17' preferably block backward.

To achieve the 4 times 3 speeds, i.e., a total of 12 speeds, with the depicted embodiments of FIGS. 10a and 10b, the power flow from the two planetary gear set 20', 120', and 21', 121' essentially must be consoldiated. This can preferably be done by providing a differential planetary gear set 40', 140' at the hub sleeve 940 , 109'.

As shown ion FIG. 10a, the first ring gear 11' preferably acts on the second planetary carrier 22' as the first gear output from the first planetary gear set 20', whereby the clutch device 16' must essentially also be considered part of this gear output. The second ring gear 12', on which the clutch device 17' acts analogous to the first gear output, can essentially be considered to be the second gear output. As described above, the second ring gear 12' can be rigidly connected to the differential sun wheel 42'. Thus, the two gear outputs from the first and second planetary gear sets 20' and 21' can be unified in the differential; planetary gear set 40' and coupled, via the differential planet wheel 41', with the differential ring gear 13' via a clutch device 14' of the hub sleeve 9', which assembly blocks in the driving direction of rotation.

In the second variant of the hub shift transmission shown in FIG. 10b, the first ring gear 111' preferably acts on the second planetary carrier 122' as the first gear output from the first planetary gear set 120', whereby the clutch device 16', the driving portion of which is rigidly connected to the first planetary carrier 118', must likewise be considered part of this gear output, since it acts on the second planetary carrier 122'. The second ring gear 112', on which the clutch device 17' acts analogous to the first gear output, can be considered the second gear output. However, in this embodiment, the second ring gear 112' preferably interacts with the differential ring gear 113', while the first ring gear 111' interacts with the second planetary carrier 122', by means of which the two gear outputs in the differential planetary gear set 140' are united via the differential planet wheel 141' and the power flow is transferred to the differential sun wheel 142'. The output power then flows from the sun wheel 142', which is coupled with the hub sleeve 109' via the clutch device 114' which blocks in the driving direction of rotation.

Because of the multiplicity of the speeds, the following shift chart has been prepared to describe the function and shifting capabilities of the current hub shift transmission. This chart is essentially valid for both variants of the hub shift transmission, shown in FIGS. 10a and 10b, in accordance with the present invention. In the chart, (A) indicates an external control action on the hub shift transmission, i.e., the respective free wheel or clutch device is lifted, or inactive. The resulting sequence is described with (s) and (u), where (s) means that the clutch device or the free wheel blocks, or drives, and (u) means that the clutch device or the free wheel is outrun. The capital letters indicate the cause and the small letters the effect.

SHIFTING CHART

| Speed | Clutch 16' | Freewheel 44' | Freewheel 45' | Freewheel 46' | Clutch 17' | Freewheel 49' | Freewheel 48' |
|---|---|---|---|---|---|---|---|
| 1 | s | A | A | A | A | s | u |
| 2 | s | A | A | A | A | A | s |
| 3 | s | A | A | A | s | u | u |
| 4 | u | s | u | u | A | s | u |
| 5 | u | s | u | u | A | A | s |
| 6 | u | s | u | u | s | u | u |
| 7 | u | A | s | u | A | s | u |
| 8 | u | A | s | u | A | A | s |
| 9 | u | A | s | u | s | u | u |
| 10 | u | A | A | s | A | s | u |
| 11 | u | A | A | s | A | A | s |
| 12 | u | A | A | s | s | u | u |

For the depicted embodiments, the first speed can preferably be achieved by lifting the free wheels 44', 45' and 46', as well as the clutch device 17', as a result of which the first planetary carrier 18', 118' is connected directly to the first ring gear 11', 111' via the clutch device 16', by-passing the first planetary gear set 20', 120', while the free wheel 49' blocks and the sun wheel 39' for the second planetary gear set 21', 121' activates. The free wheel 48' preferably runs forward faster under no load, that is, the free wheel 40' is outrun. The second planetary carrier 22', via the direct engagement between the driver 7', carrier 18', ring gear 11', and carrier 22', can thus preferably run at the driving speed as shown in FIG. 10a, while the differential sun wheel 42' turns with the highest step-up ratio. Inside the differential planetary gear set 40', this results in a relatively slower speed of the differential ring gear 13', by means of which the hub sleeve 9', driven via the clutch device 14', turns at its slowest speed, by means of which a hill-climbing speed with the greatest multiplication can be achieved. That is, the hub sleeve 9' would essentially turn only a portion of a revolution for each revolution of the driver 7'. In one possible embodiment, the hub sleeve 9' could possibly turn a half revolution for each revolution of the driver 7'. In further embodiments, depending on the sizes of the gears, other turning ratios would be possible, and it would be well within the skill of the artisan to provide desired turning ratios.

The second speed shifts the power transfer from free wheel 49' to the automatic free wheel 48' by lifting the free wheel 49'. The multiplication in the second planetary gear set 21' becomes less, and the second ring gear 12' and the differential sun wheel 42' run slower, as a result of which the differential ring gear 13' and thus the hub sleeve 9' run correspondingly faster for a constant speed of the second planetary gear set 21'. That is, the hub sleeve 9' would essentially turn a greater portion of a revolution for each revolution of the driver 7'. In one possible embodiment, the hub sleeve 9' could possibly turn three-quarters of a revolution for each revolution of the driver 7'.

The third speed can be achieved by lifting the lifting device at the clutch device 17' thereby engaging the clutch 17', as a result of which the second ring gear 12' is directly driven at a speed which is slower than the two speeds described above, or the direct speed of the driver 7' because of the direct connection. Since the clutch device 16' also blocks, bringing the second planetary carrier 22' to the driving speed, the differential sun wheel 42' and the differential ring gear 13' would both turn at the driving speed. The differential planet wheels 41' thus would essentially not rotate relative to the differential sun wheel 42' and the differential ring gear 13'. The hub sleeve 9' can thus be carried along at the driving speed, which corresponds to a direct drive, or one revolution of the hub sleeve 9' for each revolution of the driver 7'.

The fourth speed of the system can be achieved, in the second planetary gear set, from the third speed simply by lifting, or disengaging the clutch 17', or, from the second speed, by lifting the lifting device of the shiftable free wheel 49' to engage the free wheel 49'. In addition, in the first planetary gear set 20', the lifting device of the free wheel 44' of the first planet wheel 23' can also be lifted, thus, engaging the free wheel 44', causing this free wheel 44' to block and forcing the free wheels 45' and 46' to be overrun, whether the free wheels 45' and 46' have been lifted or not. So that the second planetary gear set 21' may also be used for translation, the clutch device 17' is lifted. To generate the speed of the hub sleeve 9', the differential sun wheel 42' again rotates with maximum multiplication and the second planetary carrier 18' turns at the slowest speed of the first planetary gear set 20', but still faster than in direct gear, or faster than bypass of the first planetary gear set 20', when the clutch device 16' blocks, or drives.

With the above description of the first four speeds, it is believed that the principle of speed generation has been described with sufficient clarity with regards to the remaining speeds. However, a further mention will be made herebelow with regard to the twelfth speed, which is reached when, to achieve the greatest overdrive multiplication, the differential sun wheel 42' turns as slowly as possible and the second planetary carrier 18' turns as fast as possible. The slowest speed for the differential sun wheel 42' can essentially be achieved by lifting the lifting device for the clutch device 17' to engage the clutch device 17', as a result of which the differential sun wheel 42' turns at the driving speed of the driver 7'. The maximum speed of the second planetary carrier 18' through the first planetary gear set 20' can be achieved by means of the lifting of the lifting device of the free wheel 46' thereby engaging the freewheel 46'. The free wheels 44' and 45' essentially must be lifted for the blocking of the free wheel 46'. The clutch device 16' is thereby overrun. The differential ring gear 13' and thus the hub sleeve 9' reach their maximum multiplication ratio with respect to the first planetary carrier 18' with its driver 7' turning at the driving speed. Thus, a single revolution of the driver 7' can possibly produce multiple revolutions of the hub sleeve 9'.

Everything said about the hub shift transmission shown in FIG. 10*a* with respect to the shifting sequence according to the shift chart can essentially apply to the generation of speeds for the hub shift transmission illustrated in FIG. 10*b*. However, the effect on the hub sleeve 109' via the clutch device 114' differs by a greater or lesser degree depending on the configuration, whereby the spread and the gear intervals can be different. The difference can essentially be due to the fact that while the second planetary carrier 122' is still driven by the first planet gear set 120', the output of the second planetary gear set 121' is to the ring gear 113' and not sun wheel 142', while the output to the clutch device 114' and the hub sleeve 109' is via the differential sun wheel 142' and not the ring gear 113'. If the rider shifts into a hill-climbing gear, the second planetary carrier 122' must turn as slowly as possible and the differential ring gear 113' must turn as fast as possible. As revealed by comparing this to the hill gear of the variant shown in FIG. 10*a*, the fast speed comes from the second planetary gear set 121' and the slow speed comes from the first planetary gear set 120'. The differential sun wheel 142' turns slowly and imparts this speed to the hub sleeve 109'. The individual speeds can essentially be produced analogously and with no changes from the shifting chart which applies to the variant shown in FIG. 10*a*, as described above.

The brake parts 4', 5' can preferably be activated by pedalling backwards and thus reversing the drive pinion 8' on the driver 7' of the first planetary carrier 18', 11' and finally the threaded portion 10', which is preferably non-rotationally connected to the first planetary carrier 18', 118'. The brake cone 5', the rotation of which is limited by a function unit not shown here, preferably turns in the direction of the brake shell 4' and forces the shell 4' outward against the hub sleeve 9', 109', by means of which braking is initiated. The braking torque can essentially be transferred via the dog clutch 37' to the bicycle frame via the lever cone 2' and the arm 3'. The clutch device 16' can preferably be equipped with lifting device 31' which can interrupt the power flow in the driving direction of rotation when the brake cone moves axially to ensure that there is a sufficient idle angle of rotation in the driving direction, so that the brake can preferably be released. Alternatively, if it is desired that a brake not be provided within the hub, one could eliminate the braking components from the hub, and, as is well within the skill of the artisan, provide brake pads or a disc brake etc. for the wheel, externally of the hub.

One feature of the invention resides broadly in the shifting arrangement for a change gear drive in multispeed hubs for bicycles, comprising a hub axle 2, a fixed cone 15 disposed on a thread 4 on this axle by means of a nut 6, a cable pulley 14 disposed axially adjacent to the fixed cone 15 on the hub axle 2, a retracting spring 16 to develop a counter-rotational force against the tractive force of a cable 27 wound on the cable pulley 14, at least one pawl 28 as a clutch operating in a direction of rotation in at least one sun gear 29 or at least one pawl 40 on other drive elements in the change gear drive as well as control elements between the shifting arrangement 1 and the pawls 28 and 40, characterized in that the control elements include at least one trip cam rod 7 to control the sun gears 29, which are disposed in at least one longitudinal slot 3 disposed coaxially to the hub axle 2, whereby at least one pawl 28 of the pawl-controlled change gear of the multispeed hub can be inserted or retracted by control movements.

Another feature of the invention resides broadly in the shifting arrangement characterized in that the pawls 28 are supported rotatably in the sun gears 29 under the initial tension of a pawl spring 45 and can push against webs 30 coaxially disposed on the hub axle 2, which webs rise between the longitudinal slots 3.

Yet another feature of the invention resides broadly in the shifting arrangement characterized in that the longitudinal slots 3 have a semicircular profile in which the trip cam rods 7 with a likewise semicircular profile can rotate around an angle 31, whereby a first shift position 37 and a second shift position 38 are obtained respectively in the two end positions of the angle 31.

Still another feature of the invention resides broadly in the shifting arrangement characterized in that the trip cam rod 7 has on its extension in the longitudinal slot 3 two profiles 33 and 34 of which the first profile 33 holds the pawl 28 continuously lifted out, in both of the two shift positions 37 and 38 of the trip cam rod 7, a second profile 34 repels the pawl 28 outwardly from the web in the first shift position 37 of the trip cam rod 7, but in the second shift position 38 of the trip cam rod 7 the pawl 28 opens the path to the web 30.

A further feature of the invention resides broadly in the shifting arrangement characterized in that the first profile 33 describes a roof shape in a plane perpendicular to the axis of rotation of the trip cam rod 7, the ridge 35 of which roof shaped profile describes a radius around the axis of rotation of the trip cam rod 7 and the two roof halves form an angle with each other, which is determined by the difference between 180° and the angle 31.

Another feature of the invention resides broadly in the shifting arrangement characterized in that the web 30 has a bevel 39 which helpfully, or advantageously deflects the pawl 28 if an overlap occurs between the edge of the pawl 20 meeting the web and the web 30.

Yet another feature of the invention resides broadly in the shifting arrangement characterized in that the edge of the pawl 20 meeting the web 30 has a bevel or a rounding which transitions into the radially inward facing side wall of the pawl 28 and deflects the pawl 28 on the web 30 and/or on its bevel 39.

Still another feature of the invention resides broadly in the shifting arrangement characterized in that the second profile 34 is a straight surface which gives the cross-section of the cam trip rod 7 a crescent shape and deflects the pawl 28 in the first shift position 37 from the web 30, but in the second shift position 38 permits engagement against the web 30 on the hub axle 2. A further feature of the invention resides broadly in the shifting arrangement characterized in that at least one cam trip rod 7 is associated with the pawl 28 of each sun gear 29, 29', whereby in its orbit the pawl 28 alternatingly travels past a web 30 and a cam trip rod 7 on the hub axle 2.

Another feature of the invention resides broadly in the shifting arrangement characterized in that the cam trip rod 7 has the first profile 33 where engagement of the pawl 28 should not occur in any of the possible shift positions 37 and 38 of the cam trip rod 7 and that the cam trip rod 7 has the second profile 34 where the pawl 28 is deflected in the first shift position 37 when it moves in a direction of rotation 32 and that the pawl 28 arrives in the second shift position 38 to engage with the web 30 when it moves in the direction of rotation 32.

Yet another feature of the invention resides broadly in the shifting arrangement characterized in that the cam trip rod 7 has a hook 8 which is bent at a right angle from the cam trip rod 7 and is guided on both sides by two engaging pieces 10 which are disposed on a plate cam 18.

Still another feature of the invention resides broadly in the shifting arrangement characterized in that an even number of longitudinal slots 3 is disposed on the circumference of the hub axle 2, whereby in each case they are identical to the cam trip rods 7 opposing them at a 180° angle.

A further feature of the invention resides broadly in the shifting arrangement characterized in that the hook 8 of one cam trip rod 7 assumes the control in each case of a sun gear 29, 29' and that thus one hook 8 is associated in each case as a shift unit with the engaging pieces 10 on a bearing disk 11, the plate cam 18, the cam lever 9 and the associated cam ring here 23 via the cam trip rod 7.

Another feature of the invention resides broadly in the shifting arrangement characterized in that each hook 8 is disposed viewed axially between the plate cam 18 and the bearing disk 11, whereby the plate cam 18 transfers the control movement acting from the outside to the hook 8 via its engaging pieces 10, while the bearing disk 11 is non-rotatably connected with the hub axle 2 via at least one positioning nose 12.

Yet another feature of the invention resides broadly in the shifting arrangement characterized in that the plate cam 18 and the bearing disk 11 are pretensioned against each other in a direction of rotation by means of a spring 19.

Still another feature of the invention resides broadly in the shifting arrangement characterized in that at least one cam lever 9 is disposed on the bearing disk 11, which cam lever 9 has radially outward a cam 41 which interacts with a cam path 42 which is disposed in each of the cam rings 21–24.

A further feature of the invention resides broadly in the shifting arrangement characterized in that the cable pulley 14 is coaxially connected with a first cam ring 21, this with a second cam ring 22, this with a third cam ring 23, and this, in turn, with a fourth cam ring 24 to a tubular shift control element.

Another feature of the invention resides broadly in the shifting arrangement characterized in that at least one of the cam rings 24 in this case has a curve 43 profiled in the axial direction on a plane surface which interacts with a sliding arrangement 44 which is connected with a connecting sleeve 25, whereby an axial movement is transferable to the connecting sleeve 25 secured against rotation.

Yet another feature of the invention resides broadly in the shifting arrangement characterized in that the connecting sleeve 25 encircles the cam rings 21–24 in a tubular shape.

Still another feature of the invention resides broadly in the shifting arrangement characterized in that the connecting sleeve 25 is rotatably supported on at least one of the four cam rings 21–24.

A further feature of the invention resides broadly in the shifting arrangement characterized in that the connecting sleeve 25 has a bevel 39 which, with axial movement of the connecting sleeve 25, can lift clear or engage a pawl 40 in the change gear drive of the multispeed hub.

Types of transmissions for bicycles, and components thereof, which may be utilized in accordance with the embodiments of the present invention may be disclosed in the following U.S. Pat. No. 3,944,253 to Ripley on Mar. 16, 1976, entitled "Infinitely Variable Transmission for Pedal-Driven Vehicles"; U.S. Pat. No. 4,973,297 to Bergles on Nov. 27, 1990, entitled "Multispeed Drive Hub With More Than Three Speeds"; U.S. Pat. No. 4,721,015 to Hartmann on Jan. 26, 1988, entitled "Three Stage Planetary Driving Wheel for Pedal Powered Vehicles"; U.S. Pat. No. 4,063,469 to Bergles on Dec. 20, 1977, entitled "Multiple Speed Hub for a Vehicle Wheel"; U.S. Pat. No. 4,727,965 to Zach et al.; U.S. Pat. No. 4,721,013 to Steuer et al.; U.S. Pat. No. 4,651,853 to Bergles et al.; U.S. Pat. No. 4,628,769 to Nagano; and U.S. Pat. No. 4,400,999 to Steuer; and U.S. Pat. No. 5,273,500.

Additional examples of bicycle hubs and the components thereof are disclosed by the German Published Patent Applications DE-OS 44 02 344 and DE-OS 43 42 347 and any published equivalents thereof.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one of the embodiments or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 15 266.3, filed on Apr. 30, 1994, having inventor Gerhard Meier-Burkamp, and DE-OS P 44 15 266.3 and DE-PS P 44 15 266.3, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A multi-speed hub for a bicycle having a frame and at least one wheel, the multi-speed hub for mounting the at least one wheel to the frame, said hub comprising:

a shaft for being non-rotationally connected to the frame;

input means for inputting rotational power to the hub;

sleeve means disposed concentrically about said shaft means for receiving rotational power from said input means and transferring rotational power to the at least one wheel, said sleeve means comprising means for being connected to the at least one wheel;

transmission means disposed within said sleeve means about said shaft means for transferring the input rotational power from said input means to said sleeve means;

said transmission means comprising at least one sun gear rotatably disposed about said shaft means, said at least one sun gear being rotatable in at least a first direction of rotation about said shaft means, and said at least one sun gear being engageable with said shaft means and disengageable from said shaft means to provide at least two different speeds of said hub;

said at least one sun gear comprising an inner portion disposed towards said shaft means, and said at least one sun gear comprising at least one first member pivotably disposed on said inner portion of said at least one sun gear;

said shaft means defining a longitudinal axis, and said shaft means comprising:
at least one surface for engaging with said at least one first member in at least said first direction of rotation of said sun gear about said shaft means to non-rotatably engage said at least one sun gear with said shaft means; and
means for selectively inhibiting engagement of said at least one first member with said at least one surface;
said means for selectively inhibiting engagement being disposed before said at least one projection in said first direction of rotation;
said means for selectively inhibiting engagement being selectively pivotable between a first position and a second position, said first position for permitting engagement between said at least one first member and said at least one surface, and said second position for inhibiting engagement of said at least one first member with said at least one surface;
said means for selectively inhibiting engagement being selectively pivotable about a pivot axis, said pivot axis being substantially parallel to said longitudinal axis and offset radially from said longitudinal axis; and said hub additionally comprising means for selectively pivoting said means for selectively inhibiting engagement between said first and second positions.

2. The hub according to claim 1, wherein:

said shaft means comprises an external portion defining a periphery of said shaft means;

said external portion comprises at least one slot disposed along said shaft means in the longitudinal direction of said shaft means, said slot comprising at least a first longitudinal edge at said periphery of said shaft means;

said first longitudinal edge comprising said at least one surface;

said means for selectively inhibiting engagement comprises at least one rod disposed along at least a portion of said at least one slot and extending between said at least one sun gear and said shaft means; and said at least one rod comprises at least a first portion for engaging with said at least one first member, said first portion, in said first position of said at least one rod, being disposed for permitting entry of said at least a first member into said at least one slot for engagement between said at least a first member and said first edge of said at least one slot, and said first portion, in said second position of said at least one rod, being disposed for inhibiting entry of said at least a first member into said at least one slot for inhibiting engagement between said at least a first member and said first edge of said at least one slot.

3. The hub according to claim 2, wherein:

said at least one sun gear comprises biasing means for biasing said at least one first member radially inwardly away from said at least one sun gear;

said at least one slot comprises a semi-cylindrical slot having a semi-circular cross-section extending through a first angle;

said at least one rod comprises a semi-cylindrical slot having a semi-circular cross-section substantially similar to the semi-circular cross-section of said at least one slot and extending through a second angle; and said second angle being less than said first angle to permit pivoting of said at least one rod within said at least one slot between said first and second positions with said at least one rod remaining substantially entirely within said at least one slot.

4. The hub according to claim 3, wherein:

said at least one slot comprises at least-first and second slots;

said at least one rod comprises at least a first rod disposed within said first slot and a second rod disposed in said second slot;

said at least one sun gear comprises at least a first sung gear and a second sun gear disposed substantially adjacent one another about said shaft means, each of said first and second sun gears comprise at least one first member;

each of said first and second rod comprise a first cross-sectional profile disposed substantially transverse to said longitudinal axis, said first profile of said first rod being disposed at said first sun gear, and said first profile of said second rod being disposed at said second sun gear;

each of said first and second rod comprise a second cross-sectional profile disposed substantially transverse to said longitudinal axis, said second profile of said first rod being disposed at at least said second sun gear, and said second profile of said second rod being disposed at at least said first sun gear;

said first profile being configured for inhibiting engagement of said at least one first member with said at least one surface in both said first and second positions of said rod and during pivoting between said first and second positions; and said second profile comprising said first portion for permitting entry of said at least a first member into said at least one slot in said first position of said at least one rod, and for inhibiting entry of said at least a first member into said at least one slot in said second position of said at least one rod.

5. The hub according to claim 4, wherein:

each of said first and second rods defines a first longitudinal edge disposed towards said first longitudinal edge of said slot, and a second longitudinal edge disposed parallel to said first edge and opposite said first edge;

said shaft means defines a circumference, said first and second slots being disposed radially inwardly from said circumference;

said pivot axis of said first and second rods is disposed substantially at said circumference of said shaft means;

said pivot axis of said first and second rods defines a peak of said first profile, wherein said first profile defines first and second surfaces extending from said peak to respective ones of said first and second edges of said rod, said first and second surface being disposed at said second angle with respect to one another; and said second profile comprises a third surface disposed substantially directly from said first edge to said second edge of said rod, said third surface being spaced a distance from said pivot axis, said first portion of said first and second rods comprising a portion of said third surface at said first edge of said rods.

23

6. The hub according to claim 5, wherein:

said first member of said first and second sun gears comprises a pawl;

each said pawl having a first end pivotably mounted in one of said first and second sun gears, a second end spaced apart from said first end and biased radially inwardly via said biasing means, a first longitudinal side disposed between said first and second ends and towards said shaft means, and a first edge disposed between said second end and said first side, said second end for engaging said surface of said first longitudinal edge of said slot; and at least one of:

said first longitudinal edge of said slot; and said first edge of said pawl; being bevelled or rounded for guiding movement of said pawl over said first longitudinal edge during rotation of said pawl in said first direction.

7. The hub according to claim 6, wherein:

said hub has a first end and a second end, said shaft means extending between said first and second ends;

said first and second rods have a first end disposed towards said first end of said hub and extend along said shaft means under its corresponding sun gear disposed at said second profile of said rod;

said first end of each said rod comprising a radially outwardly disposed flange extending radially away from said shaft means, said flange having a first end towards said shaft means connecting said flange means with said rod, and a second end away from said shaft means; and said means for selectively pivoting said means for selectively inhibiting engagement comprise means for engaging at least a portion of said flange means to pivot said second end of said flange means about said pivot axis and thereby pivot said first end of said flange means in an opposite direction about said pivot axis to pivot said rod between said first and second positions.

8. The hub according to claim 7, wherein:

said means for selectively pivoting said means for selectively inhibiting engagement additionally comprises at least first and second annular members disposed about said shaft means and substantially adjacent one another, said first and second annular members being selectively rotatable about said shaft means;

said first annular member comprising said means for engaging at least a portion of said flange means of said first rod, and said second annular member comprising said means for engaging at least a portion of said flange means of said second rod;

said means for engaging comprising at least first and second portions extending axially away from each of said first and second annular members;

said flange means being disposed between said first and second portions for movement along with said first and second portions upon rotation of said first and second annular members; and said means for selectively pivoting said means for selectively inhibiting engagement additionally comprises means for individually selectively rotating said first and second annular members.

9. The hub according to claim 8, wherein:

said means for selectively individually rotating said first and second annular members comprises cam means, said cam means comprising:

24 at least third and fourth annular members, said third and fourth annular members being non-rotationally disposed about said shaft means, and said third annular member being disposed adjacent said first annular member to form a first annular member pair and said fourth annular member being disposed adjacent said second annular member to form a second annular member pair;

at least a first cylindrical member rotatably disposed about said at least a third and fourth annular member, said at least a first cylindrical member comprising at least a first cam path encircling said third annular member and a second cam path encircling said fourth annular member;

at least a first cam lever pivotably disposed on each of said third and fourth annular members, each said first cam lever comprising a cam follower for following a respective one of said first and second cam paths; and means for biasing said cam follower into engagement with its respective cam path, said means for biasing comprising a biasing member disposed between annular members of said first and second annular member pairs to rotatably bias said first and second annular members with respect to said third and fourth annular members, to bias at least one of said first and second extending portions of said first and second annular members against its respective cam lever of the other of said third and fourth annular members, and bias its respective cam follower radially outwardly into engagement with its respective cam path;

said means for selectively pivoting said means for selectively inhibiting engagement additionally comprises means for selectively rotating said first cylindrical member about said shaft means to move said first and second cam paths relative to respective cam followers;

said first and second cam paths having at least a first portion for holding respective cam followers, cam levers and said first and second annular members in a first position relative to said shaft means, and a second portion for permitting a radially outward movement of respective cam followers and a radially outward pivoting of respective cam levers for permitting rotation of a respective one of said first and second annular members; and said second portion of said first and second cam paths being rotationally offset from one another in a direction of rotation of said first cylindrical member about said shaft means to individually rotate said first annular member upon a first amount of rotation of said first cylindrical member about said shaft means, and individually rotate said second annular member upon a second amount of rotation of said first cylindrical member about said shaft means to thereby pivot said first rod between said first and second positions upon said first amount of rotation of said first cylindrical member about said shaft means, and pivot said second rod between said first and second positions upon said second amount of rotation of said first cylindrical member about said shaft means.

10. The hub according to claim 9, wherein:

said hub comprises a cylindrical outer housing;

said means for selectively rotating said first cylindrical member about said shaft means comprises:

a pulley disposed adjacent said first cylindrical member, said first cylindrical member being non-rotationally connected to said pulley means;

a cable wrapped about at least a portion of said pulley and having an end affixed to said pulley, said cable extending out of said housing substantially tangentially to said pulley; and means for applying a pulling force on said cable to unwrap the cable from said pulley and rotate said pulley in a first direction about said shaft means;

said hub additionally comprises biasing means for applying an opposing tension to said pulley to counter said pulling force of said cable and rotate said pulley in a second direction about said shaft means, said second direction of rotation of said pulley being opposite said first direction of rotation of said pulley to rewind said cable back onto said at least a portion of said pulley;

said at least first and second sun gears comprise a plurality of sun gears disposed about said shaft means;

said hub comprises at least two slots, two rods, one annular member pair, one cam lever and one cam path for each sun gear;

said at least two slots being disposed substantially opposite one another about said shaft means;

said first and second projecting portions for engaging said flange means comprise pins extending axially;

said first cylindrical member comprises individual ring-shaped members, fastened together side-by-side, with each individual ring shaped member defining one of said cam paths;

one of said individual ring shaped members being disposed axially farthest from said pulley;

said one of said individual ring-shaped members comprising an additional axially disposed cam surface;

said transmission means additionally comprises at least one additional cylindrical member disposed concentrically about said shaft means and encircling at least a portion of said first cylindrical member;

said additional cylindrical member comprises at least one additional pawl extending from said additional cylindrical member radially inwardly; and said transmission means additionally comprises sleeve means disposed about said first cylindrical member, said sleeve means comprising a cam follower for interacting with said axial cam surface of said one of said individual ring-shaped members to axially displace said sleeve means to engage and disengage with said additional pawl of said additional cylindrical member, said sleeve means comprising a bevelled edge disposed towards said additional pawl for sliding under and engaging said additional pawl, said sleeve means being axially displaceable in a first axial direction by said axial cam surface upon rotation of said first cylindrical member relative to said sleeve means and said cam follower of said sleeve means, and said sleeve means comprising means for biasing said sleeve means in an opposite axial direction to engage said cam follower of said sleeve means with said axial cam surface.

11. A bicycle having a frame, at least one wheel and a multi-speed hub for mounting the at least one wheel to the frame, said hub comprising:

a shaft for being non-rotationally connected to the frame, said shaft having an outer periphery;

input means for inputting rotational power to the hub;

sleeve means disposed concentrically about said shaft means for receiving rotational power from said input means and transferring rotational power to the at least one wheel, said sleeve means comprising means for being connected to the at least one wheel;

transmission means disposed within said sleeve means about said shaft means for transferring the input rotational power from said input means to said sleeve means;

said transmission means comprising at least one sun gear rotatably disposed about said shaft means, said at least one sun gear being rotatable in at least a first direction of rotation about said shaft means, and said at least one sun gear being engageable with said shaft means and disengageable from said shaft means to provide at least two different speeds of said hub;

said at least one sun gear comprising an inner portion disposed towards said shaft means, and said at least one sun gear comprising at least one first member pivotably disposed on said inner portion of said at least one sun gear;

said shaft means defining a longitudinal axis, and said shaft means comprising:

at least one slot disposed longitudinally along said periphery of said shaft means, said at least one slot comprising a surface for engaging with said at least one first member in at least said first direction of rotation of said sun gear about said shaft means to non-rotatably engage said at least one sun gear with said shaft means; and means for selectively inhibiting engagement of said at least one first member with said at least one surface;

said means for selectively inhibiting engagement being disposed within said slot;

said means for selectively inhibiting engagement being selectively pivotable between a first position and a second position, said first position for permitting engagement between said at least one first member and said at least one surface by permitting said at least one first member to enter at least partially into said at least one slot, and said second position for inhibiting engagement of said at least one first member with said at least one surface by prohibiting said at least one first member from substantially entering into said slot;

said means for selectively inhibiting engagement being selectively pivotable about a pivot axis, said pivot axis being substantially parallel to said longitudinal axis and offset radially from said longitudinal axis; and said hub additionally comprising means for selectively pivoting said means for selectively inhibiting engagement between said first and second positions.

12. The bicycle according to claim 11, wherein:

said shaft means comprises an external portion defining said periphery of said shaft means;

said external portion comprises said at least one slot disposed along said shaft means, and said slot comprising at least a first longitudinal edge at said periphery of said shaft means;

said first longitudinal edge comprising said at least one surface;

said means for selectively inhibiting engagement comprises at least one rod disposed along at least a portion of said at least one slot and extending between said at least one sun gear and said shaft means; and said at least one rod comprises at least a first portion for engaging with said at least one first member, said first portion, in said first position of said at least one rod, being disposed for permitting entry of said at least a first member into said at least one slot for engagement between said at least a first member and said first edge of said at least one slot, and said first portion, in said second position of said at least one rod, being disposed for inhibiting entry of said at least a first member into said at least one slot for inhibiting engagement between said at least a first member and said first edge of said at least one slot.

13. The bicycle according to claim 12, wherein:

said hub has a first end and a second end, said shaft means extending between said first and second ends;

said at least one rod have a first end disposed towards said first end of said hub and extend along said shaft means under said at least one sun gear;

said first end of each said rod comprising a radially outwardly disposed flange extending radially away from said shaft means, said flange having a first end towards said shaft means connecting said flange means with said at least one rod, and a second end away from said shaft means; and said means for selectively pivoting said means for selectively inhibiting engagement comprise means for engaging at least a portion of said flange means to pivot said second end of said flange means about said pivot axis and thereby pivot said first end of said flange means in an opposite direction about said pivot axis to pivot said rod between said first and second positions.

14. The bicycle according to claim 13, wherein:

said means for selectively pivoting said means for selectively inhibiting engagement additionally comprises at least a first annular member disposed about said shaft means, said first annular member being selectively rotatable about said shaft means;

said first annular member comprising said means for engaging at least a portion of said flange means of said at least one rod;

said means for engaging comprising at least first and second portions extending axially away from said at least a first annular member;

said flange means being disposed between said first and second portions for movement along with said first and second portions upon rotation of said first and second annular members; and said means for selectively pivoting said means for selectively inhibiting engagement additionally comprises means for individually selectively rotating said first and second annular members.

15. The bicycle according to claim 14, wherein:

said at least one sun gear comprises biasing means for biasing said at least one first member radially inwardly away from said at least one sun gear;

said at least one slot comprises at least first and second slots;

said at least one rod comprises at least a first rod disposed within said first slot and a second rod disposed in said second slot;

said at least one sun gear comprises at least a first sung gear and a second sun gear disposed substantially adjacent one another about said shaft means, each of said first and second sun gears comprise at least one first member;

each of said first and second rod comprise a first cross-sectional profile disposed substantially transverse to said longitudinal axis, said first profile of said first rod being disposed at said first sun gear, and said first profile of said second rod being disposed at said second sun gear;

each of said first and second rod comprise a second cross-sectional profile disposed substantially transverse to said longitudinal axis, said second profile of said first rod being disposed at at least said second sun gear, and said second profile of said second rod being disposed at at least said first sun gear;

said first profile being configured for inhibiting engagement of said at least one first member with said at least one surface in both said first and second positions of said rod and during pivoting between said first and second positions; and said second profile comprising said first portion for permitting entry of said at least a first member into said at least one slot in said first position of said at least one rod, and for inhibiting entry of said at least a first member into said at least one slot in said second position of said at least one rod.

16. The bicycle according to claim 15, wherein:

said at least one slot comprises a semi-cylindrical slot having a semi-circular cross-section extending through a first angle;

said at least one rod comprises a semi-cylindrical slot having a semi-circular cross-section substantially similar to the semi-circular cross-section of said at least one slot and extending through a second angle; and said second angle being less than said first angle to permit pivoting of said at least one rod within said at least one slot between said first and second positions with said at least one rod remaining substantially entirely within said at least one slot.

17. The bicycle according to claim 16, wherein:

each of said first and second rods defines a first longitudinal edge disposed towards said first longitudinal edge of said slot, and a second longitudinal edge disposed parallel to said first edge and opposite said first edge;

said shaft means defines a circumference, said first and second slots being disposed radially inwardly from said circumference;

said pivot axis of said first and second rods is disposed substantially at said circumference of said shaft means;

said pivot axis of said first and second rods defines a peak of said first profile, wherein said first profile defines first and second surfaces extending from said peak to respective ones of said first and second edges of said rod, said first and second surface being disposed at said second angle with respect to one another; and said second profile comprises a third surface disposed substantially directly from said first edge to said second edge of said rod, said third surface being spaced a distance from said pivot axis, said first portion of said first and second rods comprising a portion of said third surface at said first edge of said rods.

18. The bicycle according to claim 17, wherein:

said first member of said first and second sun gears comprises a pawl;

each said pawl having a first end pivotably mounted in one of said first and second sun gears, a second end spaced apart from said first end and biased radially inwardly via said biasing means, a first longitudinal side disposed between said first and second ends and towards said shaft means, and a first edge disposed between said second end and said first side, said second end for engaging said surface of said first longitudinal edge of said slot; and at least one of:
said first longitudinal edge of said slot; and
said first edge of said pawl; being bevelled or rounded for guiding movement of said pawl over said first longitudinal edge during rotation of said pawl in said first direction.

19. The bicycle according to claim 18, wherein:

both said first and second rods have a first end disposed towards said first end of said hub and extend along said shaft means under its corresponding sun gear disposed at said second profile of said rod;

said first end of each said rod comprising a radially outwardly disposed flange extending radially away from said shaft means, said flange having a first end towards said shaft means connecting said flange means with said rod, and a second end away from said shaft means;

said means for selectively pivoting said means for selectively inhibiting engagement comprise means for engaging at least a portion of said flange means of each said rod to pivot said second end of said flange means about said pivot axis and thereby pivot said first end of said flange means in an opposite direction about said pivot axis to pivot said rod between said first and second positions;

said means for selectively pivoting said means for selectively inhibiting engagement additionally comprises at least a second annular members disposed about said shaft means and substantially adjacent said first annular member, said second annular member being selectively rotatable about said shaft means;

said second annular member comprising said means for engaging at least a portion of said flange means of said second rod; and said means for selectively pivoting said means for selectively inhibiting engagement additionally comprises means for individually selectively rotating each of said first and second annular members individually of the other of said first and second annular members.

20. The bicycle according to claim 19, wherein:

said means for selectively individually rotating said first and second annular members comprises cam means, said cam means comprising:

at least third and fourth annular members, said third and fourth annular members being non-rotationally disposed about said shaft means, and said third annular member being disposed adjacent said first annular member to form a first annular member pair and said fourth annular member being disposed adjacent said second annular member to form a second annular member pair;

at least a first cylindrical member rotatably disposed about said at least a third and fourth annular member, said at least a first cylindrical member comprising at least a first cam path encircling said third annular member and a second cam path encircling said fourth annular member;

at least a first cam lever pivotably disposed on each of said third and fourth annular members, each said first cam lever comprising a cam follower for following a respective one of said first and second cam paths; and means for biasing said cam follower into engagement with its respective cam path, said means for biasing comprising a biasing member disposed between annular members of said first and second annular member pairs to rotatably bias said first and second annular members with respect to said third and fourth annular members, to bias at least one of said first and second extending portions of said first and second annular members against its respective cam lever of the other of said third and fourth annular members, and bias its respective cam follower radially outwardly into engagement with its respective cam path;

said means for selectively pivoting said means for selectively inhibiting engagement additionally comprises means for selectively rotating said first cylindrical member about said shaft means to move said first and second cam paths relative to respective cam followers;

said first and second cam paths having at least a first portion for holding respective cam followers, cam levers and said first and second annular members in a first position relative to said shaft means, and a second portion for permitting a radially outward movement of respective cam followers and a radially outward pivoting of respective cam levers for permitting rotation of a respective one of said first and second annular members; and said second portion of said first and second cam paths being rotationally offset from one another in a direction of rotation of said first cylindrical member about said shaft means to individually rotate said first annular member upon a first amount of rotation of said first cylindrical member about said shaft means, and individually rotate said second annular member upon a second amount of rotation of said first cylindrical member about said shaft means to thereby pivot said first rod between said first and second positions upon said first amount of rotation of said first cylindrical member about said shaft means, and pivot said second rod between said first and second positions upon said second amount of rotation of said first cylindrical member about said shaft means;

said hub comprises a cylindrical outer housing;

said means for selectively rotating said first cylindrical member about said shaft means comprises:

a pulley disposed adjacent said first cylindrical member, said first cylindrical member being non-rotationally connected to said pulley means;

a cable wrapped about at least a portion of said pulley and having an end affixed to said pulley, said cable extending out of said housing substantially tangentially to said pulley; and means for applying a pulling force on said cable to unwrap the cable from said pulley and rotate said pulley in a first direction about said shaft means;

said hub additionally comprises biasing means for applying an opposing tension to said pulley to counter said pulling force of said cable and rotate said pulley in a second direction about said shaft means, said second direction of rotation of said pulley being opposite said first direction of rotation of said pulley to rewind said cable back onto said at least a portion of said pulley;

said at least first and second sun gears comprise a plurality of sun gears disposed about said shaft means;

said hub comprises at least two slots, two rods, one annular member pair, one cam lever and one cam path for each sun gear;

said at least two slots being disposed substantially opposite one another about said shaft means;

said first and second projecting portions for engaging said flange means comprise pins extending axially; and said first cylindrical member comprises individual ring-shaped members, fastened together side-by-side, with each individual ring shaped member defining one of said cam paths.

* * * * *

UNITED STATES PATENT AND TRADEMARK OFFICE
CERTIFICATE OF CORRECTION

PATENT NO. : 5,556,354
DATED : September 17, 1996
INVENTOR(S) : Gerhard MEIER-BURKAMP It is certified that error appears in the above-indentified patent and that said Letters Patent is hereby corrected as shown below:

In column 7, line 4, after 'positions', delete "thereby between," and insert --therebetween,--.

In column 11, line 24, after the second occurrence of 'and', delete "3'." and insert --39'.--.

In column 11, line 41, after the second occurrence of 'device', delete "1'," and insert --17',--.

In column 12, line 46, after 'device', delete "14'," and insert --17',--.

In column 13, line 49, after the first occurrence of '12',' delete the second occurrence of " 12' " and insert --112'--.

In column 13, line 62, after the first occurrence of 'wheel', delete "40'," and insert --49',--.

In column 14, line 15, after 'sleeve', delete "940 ," and insert --9',--.

In column 15, in the table, under the column entitled 'Speed', before the line beginning with "2" insert --1--.

In column 17, line 31, after '18',', delete " 11' " and insert --118'--.

UNITED STATES PATENT AND TRADEMARK OFFICE
CERTIFICATE OF CORRECTION

PATENT NO.  : 5,556,354
DATED       : September 17, 1996
INVENTOR(S) : Gerhard MEIER-BURKAMP It is certified that error appears in the above-indentified patent and that said Letters Patent is hereby corrected as shown below:

In column 22, line 11, Claim 4, after the second occurrence of 'at', delete "least-first" and insert --least first--.

In column 22, line 16, Claim 4, after 'first', delete "sung" and insert --sun--.

In column 27, line 53, Claim 15, after 'first', delete "sung" and insert --sun--.

Signed and Sealed this

Seventeenth Day of June, 1997

Attest:

BRUCE LEHMAN

*Attesting Officer*      Commissioner of Patents and Trademarks